US008848106B2

(12) United States Patent
Ohmae et al.

(10) Patent No.: US 8,848,106 B2
(45) Date of Patent: Sep. 30, 2014

(54) COMMUNICATION DEVICE, COMMUNICATION SYSTEM, COMMUNICATION METHOD, CONTROL PROGRAM, AND TELEVISION RECEIVING SYSTEM

(75) Inventors: Ryosuke Ohmae, Osaka (JP); Shinichi Katoh, Osaka (JP); Fumiaki Suzuki, Osaka (JP); Yohichi Eguchi, Osaka (JP); Seiji Imanishi, Osaka (JP); Takaomi Fujimoto, Osaka (JP); Yoshinori Moto, Osaka (JP); Kazuma Naito, Osaka (JP); Atsushi Hanzawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/239,983

(22) PCT Filed: Apr. 2, 2012

(86) PCT No.: PCT/JP2012/059004
§ 371 (c)(1),
(2), (4) Date: May 15, 2014

(87) PCT Pub. No.: WO2013/027438
PCT Pub. Date: Feb. 28, 2013

(65) Prior Publication Data
US 2014/0247396 A1 Sep. 4, 2014

(30) Foreign Application Priority Data

Aug. 23, 2011 (JP) ................................. 2011-182024
Mar. 29, 2012 (JP) ................................. 2012-078139

(51) Int. Cl.
*H04N 7/14* (2006.01)
*H04N 5/268* (2006.01)

(52) U.S. Cl.
CPC ..................................... *H04N 5/268* (2013.01)
USPC ........ 348/552; 348/705; 348/553; 348/14.02;
348/739; 348/729

(58) Field of Classification Search
USPC ........... 348/552, 553, 14.02, 14.11, 705, 706,
348/725, 729, 731, 739; 370/250, 252;
725/109, 117, 120
See application file for complete search history.

(56) References Cited

U.S. PATENT DOCUMENTS 8,253,772 B2 * 8/2012 Book .......................... 348/14.01
2011/0194454 A1 * 8/2011 Ohmae ......................... 370/252

FOREIGN PATENT DOCUMENTS

JP          2008-113133 A      5/2008
JP          2011-103590 A      5/2011

* cited by examiner

*Primary Examiner* — Jefferey Harold
*Assistant Examiner* — Jean W Desir
(74) *Attorney, Agent, or Firm* — Birch, Stewart, Kolasch & Birch, LLP

(57) ABSTRACT

A display section (2) includes: a display-end path switching section (50) for detecting, within a LAN, a tuner section (1) with use of a pairing ID which is obtained for establishing communication via a communication path (a) and which is generated with use of a MAC address of the tuner section (1); and a display-end connection processing section (52) for establishing communication with the tuner section (1) via a communication path (c).

14 Claims, 30 Drawing Sheets

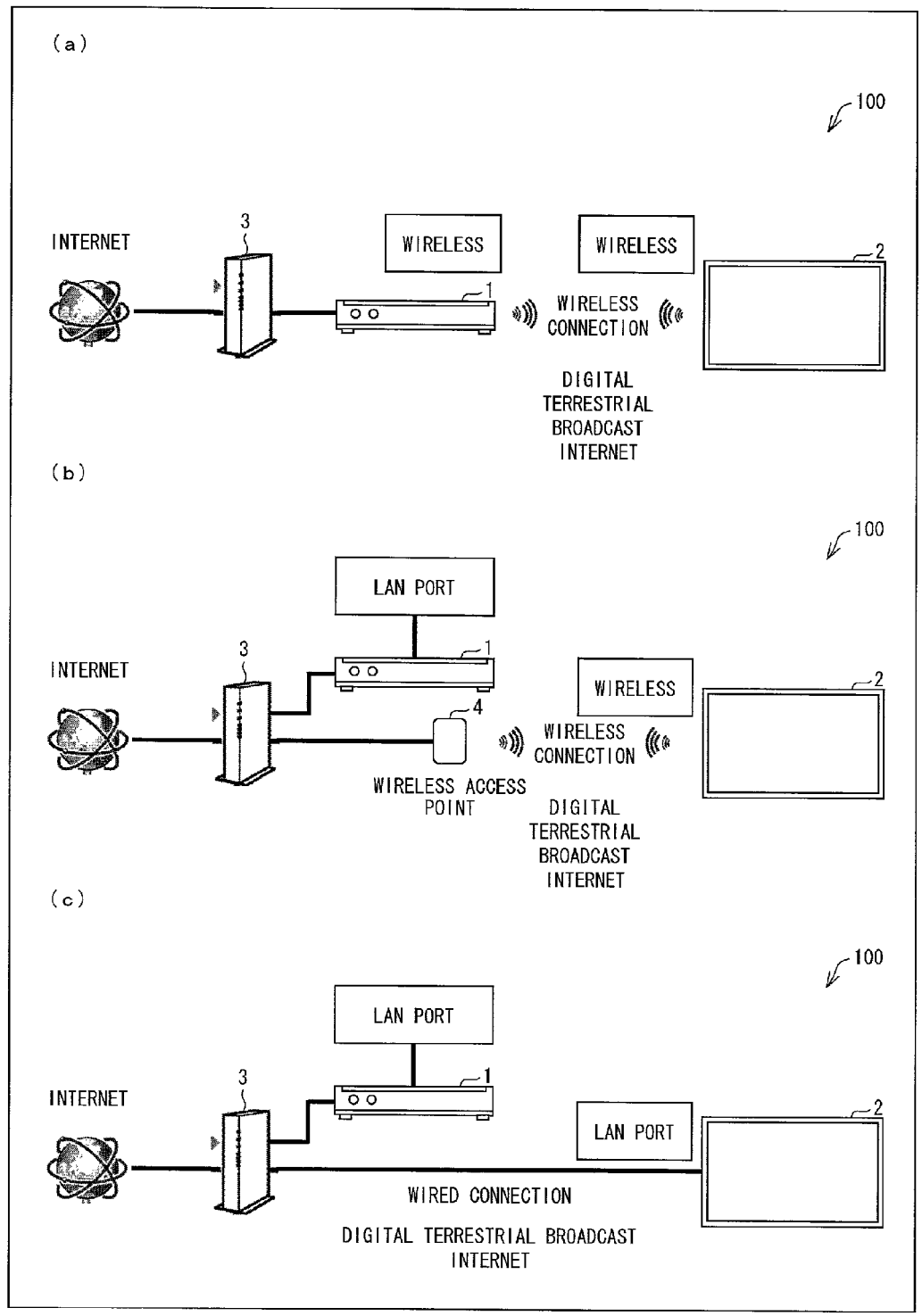

F I G. 4
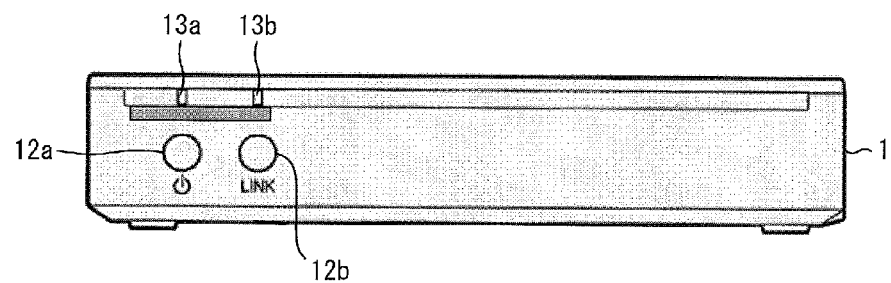

F I G. 8
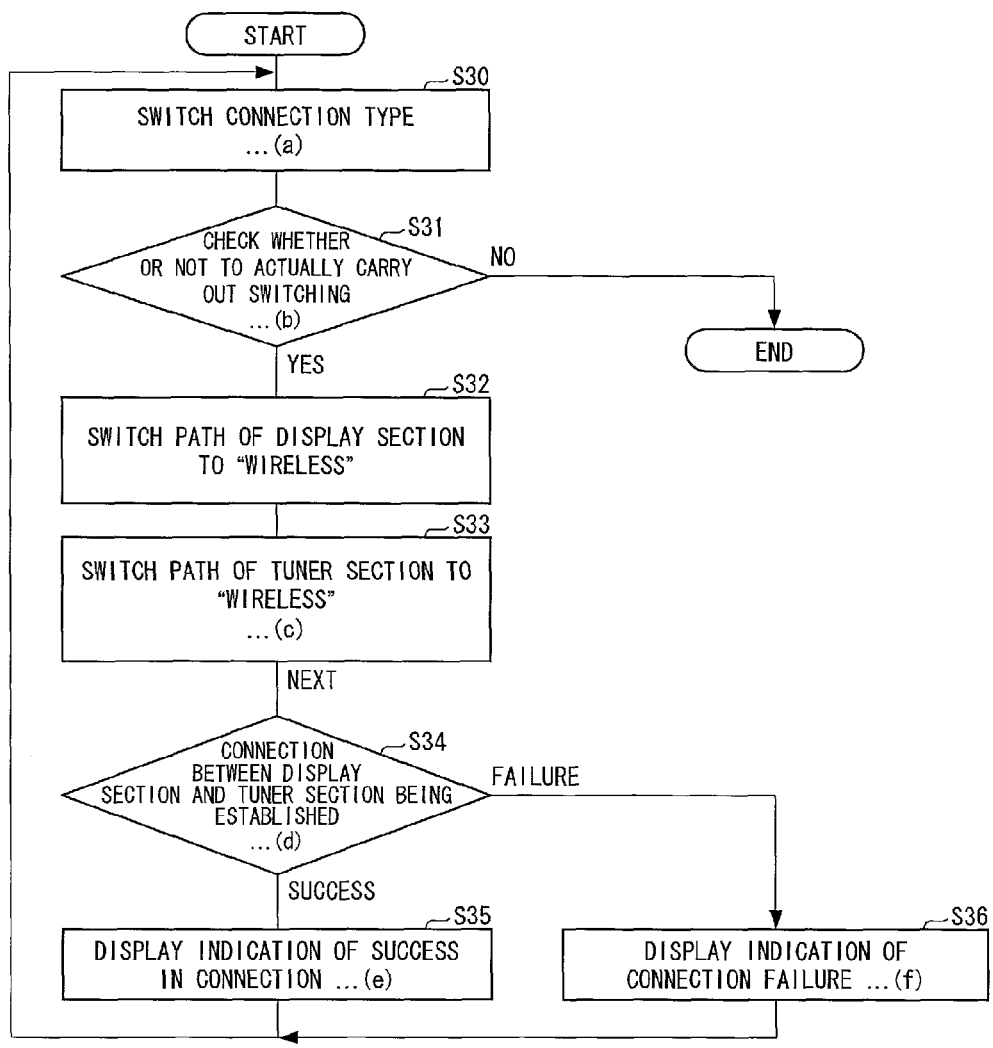

A connection type by which to connect to the tuner section will be switched.

[Current Connection]
XXXXXXXXXX Connection

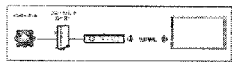
Tuner Wireless Connection
Directly connect to the tuner section.

Wireless Access Point Connection
Connect to the tuner section via a wireless access point.

LAN Cable Connection
Connect to the tuner section by connecting a LAN cable to the display section.

(b)

The connection type will be switched to "Wireless Access Point Connection."

Do you wish to execute connection type switching?
(Please do not switch the connection type during record programming or while the access lamp of USB/HDD is turned on.)

| Yes | No |

(c)

Do you wish to connect to the same wireless access point as the last time?

| Yes | No |

Network Name (SSID) : abcdefg
Security Type      : WEP2
Security Key       : *******

(d)

The access point will be registered.
If the access point is compatible with WPS, please select "WPS."
(See the instruction manual of the access point for details)

| WPS | Connect to access point that is compatible with WPS. |
| Access Point Selection | Select which access point to connect to. |
| Access Point Registration | Manually register the access point to connect to. |

(e)

Setting of the connection to the wireless access point has been completed.

Network Name (SSID) : abcdefg
Security Type      : WEP2
Security Key       : *******

| Next |

F I G. 1 3

(a)

The selected access point is not secured.
Since an unsecured access point cannot connect to the tuner section, the digital broadcast content and USB/HDD etc. will not be available.

Do you wish to connect to the selected access point?

| Yes | No |

(b)

Please select the security type used for the access point.
(If "None", the access point cannot connect to the tuner section. Therefore, the digital broadcast content and USB/HDD etc. will not be available.)

WEP

WPA

WPA2

None

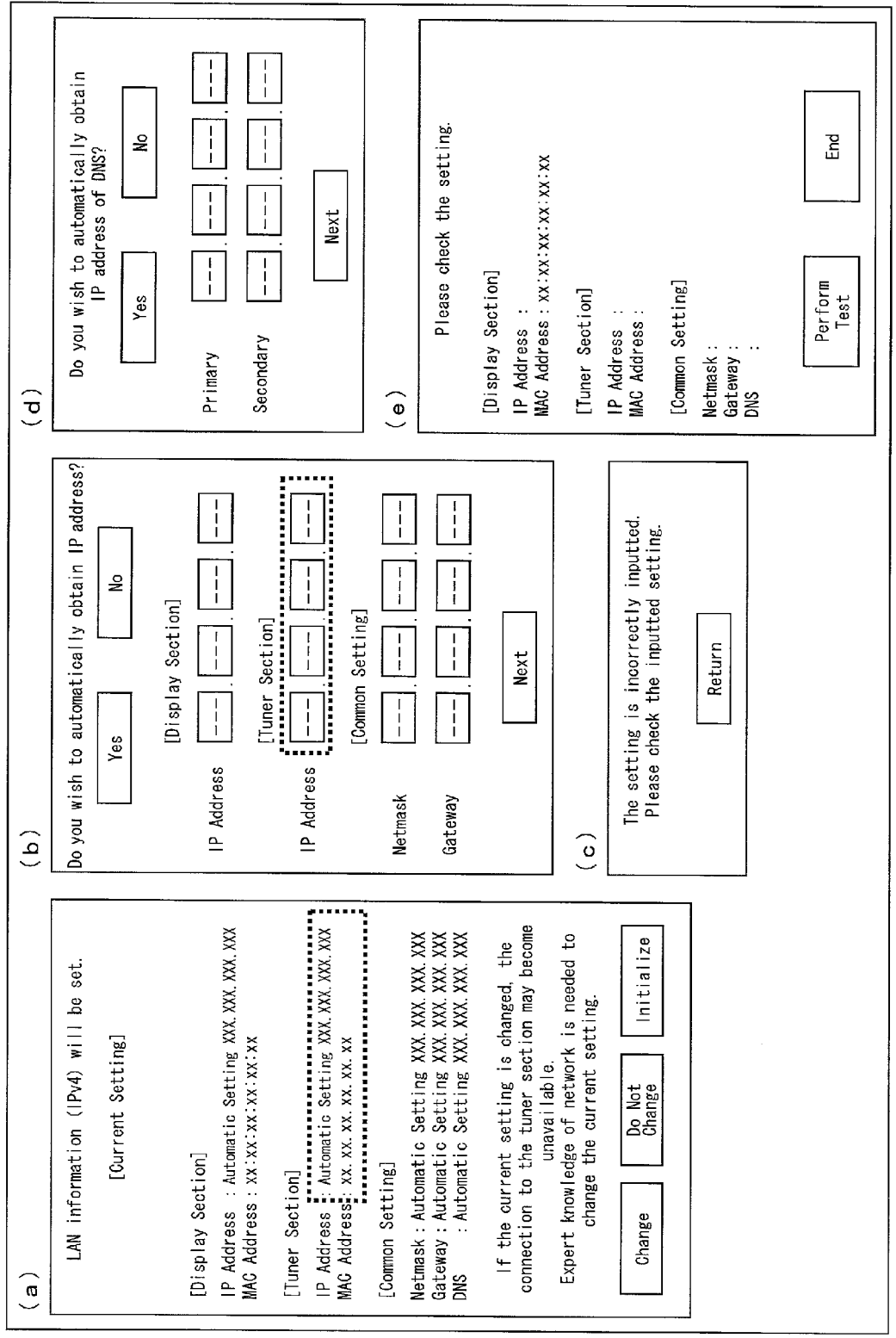

F I G. 2 2
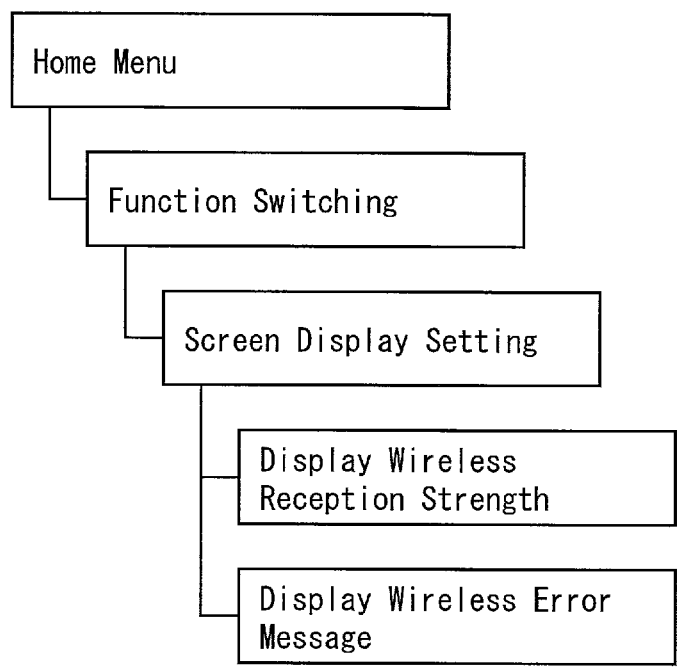

FIG. 30

CAUTION NOT DISPLAYED WHERE × IS MARKED.

| | TUNER WIRELESS CONNECTION ||| WIRELESS ACCESS POINT CONNECTION ||| LAN CABLE CONNECTION |||
|---|---|---|---|---|---|---|---|---|---|
| | DIGITAL BROADCAST USB-HDD | IPTV INTERNET DLNA | CALENDAR /CLOCK EXTERNAL INPUT USB APPLICATION | DIGITAL BROADCAST USB-HDD | IPTV INTERNET DLNA | CALENDAR /CLOCK EXTERNAL INPUT USB APPLICATION | DIGITAL BROADCAST USB-HDD | IPTV INTERNET DLNA | CALENDAR /CLOCK EXTERNAL INPUT USB APPLICATION |
| WIRELESS AP NOT CONNECTED | × | × | × | | | × | | | × |
| LAN CABLE NOT CONNECTED | × | × | × | | × | × | × | | × |
| CONNECTION BETWEEN TUNER SECTION AND DISPLAY SECTION LOST | | | × | | | × | | | × |
| INTERFERENCE | | × EXCEPT WHILE DLNA VIDEO IS BEING PLAYED | × | | × EXCEPT WHILE DLNA VIDEO IS BEING PLAYED | × | | × EXCEPT WHILE DLNA VIDEO IS BEING PLAYED | × |
| THROUGHPUT DECREASED | × | × | × | × | × | × | | × EXCEPT WHILE DLNA VIDEO IS BEING PLAYED | × |
| WIRELESS RECEPTION STRENGTH DECREASED | | × EXCEPT DLNA | × | × | × | × | × | × | × |
| RADAR WAVES DETECTED | | | × | × | × | × | × | × | × |

In order for the digital broadcast content and USB/HDD to be available, a security system needs to be set up for the access point to which the display section is being connected.

Please change *Wireless Access Point Setting* of Home Menu or the setting of the access point device.

(b)

The recording has failed since the connection type was switched during the recording.

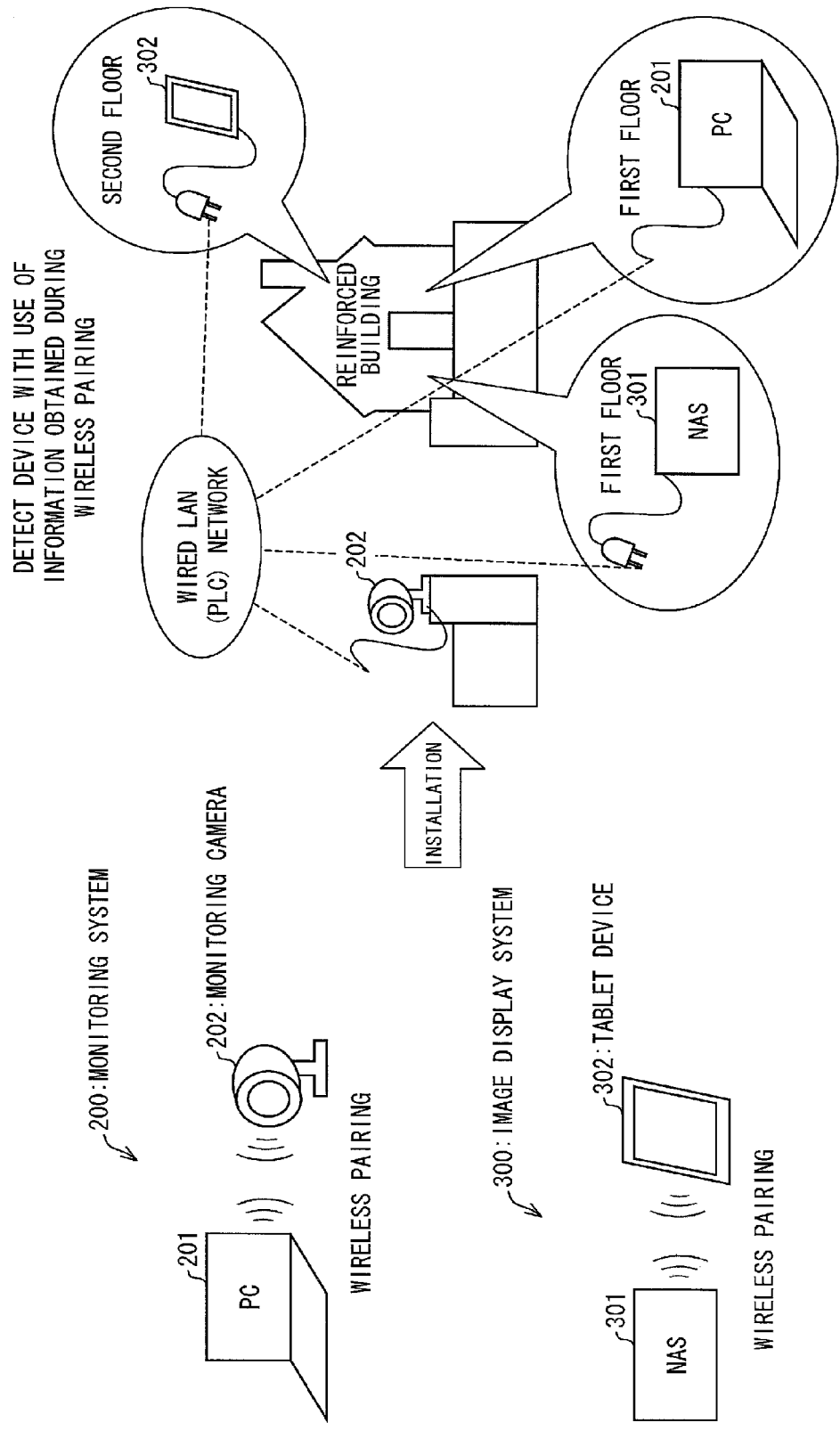

COMMUNICATION DEVICE, COMMUNICATION SYSTEM, COMMUNICATION METHOD, CONTROL PROGRAM, AND TELEVISION RECEIVING SYSTEM

TECHNICAL FIELD

The present invention relates to a communication device (communication apparatus) that carries out communication via a plurality of communication paths. More specifically, the present invention relates to a technology that makes it easy to set a function of switching between the communication paths of the communication device.

BACKGROUND ART

In recent years, it is becoming increasingly common to connect various home electronic devices via wired or wireless connections. Establishing communication between the electronic devices, allows the electronic devices to exchange information therebetween and to control one another. This allows the electronic devices to be used in unprecedented form.

For example, by wirelessly connecting a display and a tuner, it is made possible to establish a television receiving system by which the display is freely mobile within a range in which the display can communicate with the tuner.

In this system, it is also possible to connect the tuner to a LAN so as to establish a connection in which the display and the tuner can communicate via the LAN. This allows, with control of the tuner, an image or the like, which has been transmitted from another device that is connected to the LAN, to be transmitted to the display via the LAN and then displayed. It is also possible to, for example, to use the Internet on the display with the use of a broadband router connected to the LAN.

Note that, in a case where the communication between electronic devices are to be established, there arises a need to set up the communication establishment. Naturally, different settings are required for different communication paths. According to the example above, therefore, such a setting is necessary that, when a switch is to be made from wireless communication to LAN communication, the tuner, out of all the devices connected to the LAN, is selected and specified as a connection destination. Such a setting process is troublesome to many users, and can involve considerable difficulties.

Therefore, it is one of the major challenges of electronic devices with communication functions to figure out how to simplify such a process of setting the communication establishment. The following Patent Literature 1 is an example of technologies for simplifying the process of setting the communication establishment.

Specifically, Patent Literature 1 discloses a configuration in which (i) an access point device and a client device each store a common setting information generating key therein and (ii) the client device identifies the access point device by use of the common setting information generating key. This configuration liberates a user from such a process of manually identifying the access point device to connect to, and thus makes it easy to set communication establishment.

CITATION LIST

Patent Literature

Patent Literature 1
Japanese Patent Application Publication, Tokukai, No. 2008-113133 A (Publication Date: May 15, 2008)

SUMMARY OF INVENTION

Technical Problem

The conventional technology above, however, completely neglects switching of communication paths, and it is therefore difficult to apply the technology when switching between communication paths. This is because, when switching between the communication paths, the access point may not necessarily be a device to which the client device is intended to be connected.

The present invention has been made in view of the problem, and it is an object of the present invention to provide a communication device and the like which make it easy to set a function of switching between communication paths.

Solution to Problem

In order to attain the object, a communication device of the present invention is a communication device for communicating with a partner device via a first communication path or a second communication path, including: device detecting means for detecting, in a case where a switch to communication via the second communication path is to be made, the partner device with use of partner device specifying information for specifying the partner device, which partner device specifying information is obtained for establishing communication via the first communication path; and communication establishing means for establishing the communication, via the second communication path, with the partner device which has been detected by the device detecting means.

In order to attain the object, a method of the present invention is a method in which a communication device communicates with a partner device via a first communication path or a second communication path, the method including the steps of: (i) detecting, in a case where a switch to communication via the second communication path is to be made, the partner device with use of partner device specifying information for specifying the partner device, which partner device specifying information is obtained for establishing communication via the first communication path; and (ii) establishing the communication, via the second communication path, with the partner device which has been detected in the step (i).

In order to attain the object, a television receiving system of the present invention includes: a tuner section for converting a broadcast wave into an image signal; and display section for communicating with the tuner section via a first communication path or a second communication path so as to display an image in accordance with the image signal, the display section including (i) device detecting means for detecting, in a case where a switch to communication via the second communication path is to be made, the tuner section with use of partner device specifying information for specifying the tuner section, which partner device specifying information is obtained for establishing communication via the first communication path and (ii) communication establishing means for establishing the communication, via the second communication path, with the tuner section which has been detected by the device detecting means.

Note that the communication device (display section) is capable of communicating with the partner device (tuner section) via the first or second communication path. This means that the communication device is capable of communicating with the partner device via the first communication path before switching to the communication via the second communication path. In other words, before switching to the communication via the second communication path, the partner device is already specified as a device with which to communicate.

Thus, according to the above configurations, (i) the partner device is detected with the use of partner device specifying information which is obtained for establishing communication via the first communication path and then (ii) the communication device communicates, via the second communication path, with the partner device thus detected.

Hence, according to the configurations, the detection of the partner device, which is capable of communication via the first communication path, and the establishment of the communication with the partner device via the second communication path are automated. This allows a user to, without manually executing any operation, extremely easily set a function of switching between communication paths.

Note that the communication device and the partner device are not limited to the display section and the tuner section, respectively, provided that the communication device and the partner device are each a device capable of communication via the first or second communication path. For example, the communication device and the partner device of the present invention are applicable to (i) a camera, which captures a video image or a still image, and a device, which outputs or stores such images captured by the camera, respectively or (ii) the device and the camera, respectively. Alternatively, the communication device and the partner device of the present invention are applicable to (I) a storage device, which stores content such as a video image and a still image, and an output device, which outputs the content, respectively or (II) the output device and the storage device, respectively.

Advantageous Effects of Invention

As has been described, a communication device of the present invention includes: device detecting means for detecting, in a case where a switch to communication via a second communication path is to be made, a partner device with use of partner device specifying information for specifying the partner device, which partner device specifying information is obtained for establishing communication via a first communication path; and communication establishing means for establishing the communication, via the second communication path, with the partner device which has been detected by the device detecting means.

A method of the present invention includes the steps of: (i) detecting, in a case where a switch to communication via a second communication path is to be made, a partner device with use of partner device specifying information for specifying the partner device, which partner device specifying information is obtained for establishing communication via a first communication path; and (ii) establishing the communication, via the second communication path, with the partner device which has been detected in the step (i).

A television receiving system of the present invention is configured such that a display section including (i) device detecting means for detecting, in a case where a switch to communication via a second communication path is to be made, a tuner section with use of partner device specifying information for specifying the tuner section, which partner device specifying information is obtained for establishing communication via a first communication path and (ii) communication establishing means for establishing the communication, via the second communication path, with the tuner section which has been detected by the device detecting means.

Hence, the detection of the partner device, which is capable of communication via the first communication path, and the establishment of the communication with the partner device via the second communication path are automated. This allows a user to, without manually executing any operation, extremely easily set a function of switching between communication paths.

BRIEF DESCRIPTION OF DRAWINGS

FIG. 2 is a view illustrating image transmission paths of respective connection types according to the image display system.

FIG. 4 is a view illustrating (i) a tuner section included in the image display system and (ii) external appearances of an input section and an information presenting section of the tuner section.

FIG. 8 is a flow chart illustrating respective operations of the tuner section and the display section for switching a connection type to a tuner wireless connection.

FIG. 11 is a view illustrating screens to be displayed during the operations illustrated in FIG. 10.

FIG. 13 is a view illustrating yet other screens to be displayed during the operations illustrated in FIG. 10

FIG. 21 is a view illustrating screens to be displayed during setting of IPv4 during which network parameters, such as IP addresses of the display section and the tuner section, are set.

FIG. 22 is a view illustrating arrangements of UI screens for screen display settings.

FIG. 30 is a view illustrating showing a table that determines whether or not the message is to be displayed.

FIG. 31 is a view illustrating a message to be displayed by the display section.

FIG. 32 is a view schematically illustrating a monitoring system and an image display system, to each of which the present invention is applied.

DESCRIPTION OF EMBODIMENTS

The following description will discuss, in detail, an embodiment of the present invention with reference to FIGS. 1 through 31.

[System Configuration]

Figure 1:
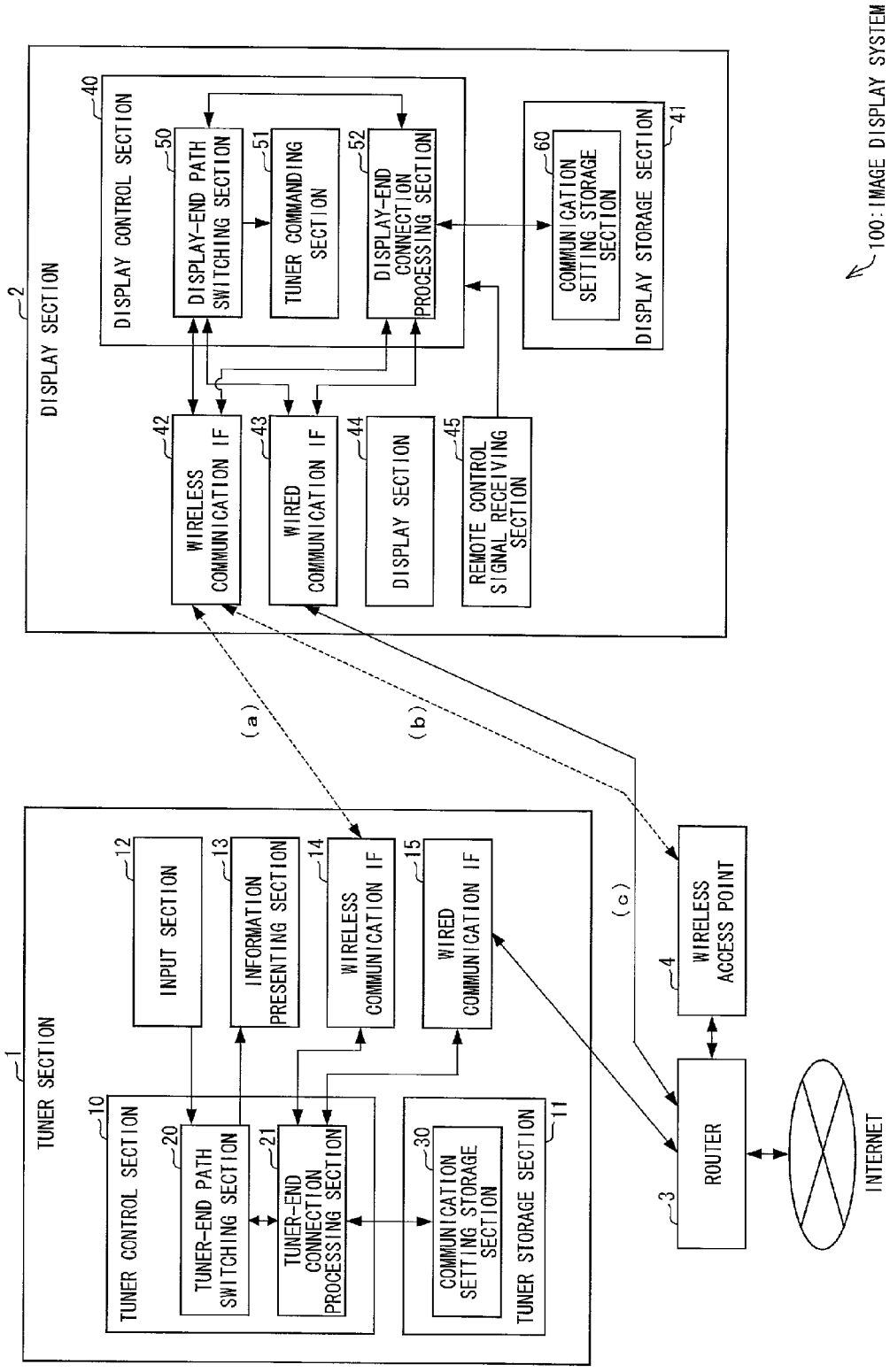
FIG. 1 is a view illustrating a main configuration of an image display system (communication system) in accordance with an embodiment of the present invention.

A configuration of an image display system of the present embodiment will be first described with reference to FIG. 1. FIG. 1 is a block diagram illustrating a main configuration of an image display system (communication system, television receiving system) 100. As illustrated in FIG. 1, the image display system 100 includes a tuner section (partner device) 1, a display section (communication device) 2, a router 3, and a wireless access point 4.

The image display system 100 is a system in which (i) the tuner section 1 generates an image signal in accordance with a broadcast wave received, (ii) the image signal is transmitted to the display section 2, and then (iii) the display section 2 displays an image in accordance with the image signal. According to the image display system 100, there are three communication paths available between the tuner section 1 and the display section 2, and the three paths are switched between and put to use.

A first communication path directly and wirelessly connects the tuner section 1 and the display section 2 (first communication path: indicated by a dotted arrow (a) illustrated in FIG. 1). A type of connection via the first connection path will be referred to as "tuner wireless connection."

A second communication path connects, via a home LAN, (i) the tuner section 1 which is connected to the home LAN (communication network) and (ii) the display section 2 which is wirelessly connected to the home LAN via the wireless access point (indicated by a dotted arrow (b) illustrated in FIG. 1). A type of connection via the second communication path will be referred to as "wireless access point connection."

As is the case of the wireless access point connection, a third communication path connects, via the LAN, the display section 2 to the tuner section 1 which is connected to the home LAN. According to the third communication path, however, the display section 2 is connected to the LAN via a wired connection that employs a LAN cable and the router 3 (second communication path: indicated by an arrow (c) illustrated in FIG. 1). A type of connection via the third communication path will be referred to as "LAN cable connection."

The tuner section 1 receives a broadcast wave, generates an image signal in accordance with the broadcast wave, and then supplies the image signal to the display section 2, so that the display section 2 displays an image in accordance with the image signal. Hence, although not illustrated, an antenna for receiving broadcast waves is connected to the tuner section 1. Although a type of broadcast wave to be received by the tuner section 1 is not limited to any particular one, the following description will employ an example in which the tuner section 1 receives digital terrestrial broadcast waves.

According to the image display system 100, as described above, there are three communication paths (connection types) available between the tuner section 1 and the display section 2. Therefore, the tuner section 1 transmits an image signal or the like to the display section 2 via a communication path corresponding to a connection type being employed.

As illustrated in FIG. 1, the tuner section 1 includes a tuner control section 10, a tuner storage section 11, an input section 12, an information presenting section 13, a wireless communication IF 14, and a wired communication IF 15.

The tuner control section 10 collectively controls an overall operation of the tuner section 1, and includes a tuner-end path switching section 20 and a tuner-end connection processing section 21. Note that the tuner control section 10 further includes (i) a constituent member for processing broadcast waves, (ii) a constituent member for storing broadcast waves in an HDD which is connected to the LAN, and the like. However, constituent members, which are not strictly relevant to the distinct features of the present invention, are not illustrated or described herein.

In accordance with an input operation received by the input section 12, the tuner-end path switching section 20 activates either the wireless communication IF 14 or the wired communication IF 15. Then, the tuner-end path switching section 20 notifies the information presenting section 13 which of the wireless communication IF 14 and the wired communication IF 15 is being active.

The tuner-end connection processing section 21 establishes communication with the display section 2, which communication corresponds to a connection type being employed.

The tuner storage section 11 stores various types of data for use in the tuner section 1, and includes a communication setting storage section 30. The communication setting storage section 30 stores respective communication settings corresponding to the different connection types. That is, the tuner-end connection processing section 21 (i) reads out, from the communication setting storage section 30, a communication setting corresponding to a connection type being employed at the time of its operation and then (ii) establishes communication in accordance with connection setting.

The input section 12 receives an input operation of a user, and then supplies, to the tuner control section 10, a control signal corresponding to the input operation. For example, the input section 12 (i) receives an input operation that commands switching between the wireless communication IF 14 and the wired communication IF 15 to be activated, and then (ii) supplies, to the tuner control section 10, a control signal that commands the switching. In addition, the input section 12 also receives an input operation that commands switching between a powered-ON state and a powered-OFF state of the tuner section 1.

The information presenting section 13 presents information indicative of an operation status and the like of the tuner section 1. Specifically, the information presenting section 13 uses an illumination state (on/off/flashing/color) of an LED lamp to present information on (i) whether the power of the tuner section 1 is in an ON state or an OFF state, (ii) whether or not the wireless communication IF 14 is activated, and (iii) the like.

The wireless communication IF 14 is an interface for direct and wireless communication with the display section 2. Although an example of using Wi-Fi for such communication will be described herein, the wireless communication via the wireless communication IF 14 is not limited to the example. In fact, any wireless communication standards can be applied to such wireless communication.

The wired communication IF 15 is an interface for communication with the display section 2 via the LAN. According to this connection type, the communication with the display section 2 via the LAN is enabled by connecting the tuner section 1 with the router 3 with the use of a LAN cable, and the wired communication IF 15 therefore includes a connection port for connecting with the LAN cable (such a connection port will be hereinafter referred to as "LAN port"). Note that the tuner section 1 need only be configured to be able to communicate with the display section 2 via the LAN. In fact, a form of the connection between the tuner section 1 and the LAN is not limited to the form described in this example.

The display section 2 receives an image signal or the like supplied from the tuner section 1, and then displays an image. The display section 2 is also capable of displaying information which was obtained from the Internet via the router 3. In addition to such an operation as displaying an image or the like, the display section 2 also carries out an operation such as controlling the operation of the tuner section 1.

As illustrated in FIG. 2, the display section 2 includes a display control section 40, a display storage section 41, a wireless communication IF 42, a wired communication IF 43, a displaying section 44, and a remote control signal receiving section 45.

The display control section 40 collectively controls an overall operation of the display section 2, and includes a display-end path switching section 50, a tuner commanding section (partner device controlling means) 51, and a display-end connection processing section (device detecting means, communication establishing means) 52. Note that the display control section 40 further includes a constituent member for causing an image to be displayed, and the like. However, constituent members, which are not strictly relevant to the distinct features of the present invention, are not illustrated or described herein.

The display-end path switching section 50 controls switching between the above-described three connection types. Note that the control of switching between the connection types will be described later in detail.

The tuner commanding section 51 controls the operation of the tuner section 1 by transmitting a command to the tuner section 1. Specific examples of such a command to be transmitted encompass (i) a command to switch between communication paths used by the tuner section 1 and (ii) a command to switch between receiving channels. Note that, although not illustrated, the tuner commanding section 51 transmits a command or the like to the tuner section 1 via one of the wireless communication IF 42 and the wired communication IF 43 which is activated by the display-end path switching section 50.

The display-end connection processing section 52 establishes communication with the tuner section 1. A form of the communication with the tuner section 1 varies, depending on a connection type being employed. Therefore, an operation to establish the communication also depends on the connection type. Such an operation will be described later in detail.

The display storage section 41 stores various types of data to be used by the display section 2, and includes a communication setting storage section 60. The communication setting storage section 60 stores respective communication settings corresponding to the different connection types. That is, the display-end connection processing section 52 (i) reads out, from the communication setting storage section 60, a communication setting corresponding to a connection type being employed at the time of its operation and then (ii) establishes communication in accordance with the communication setting.

The wireless communication IF 42 is an interface for wireless communication, and is used while the display section 2 communicates with the tuner section 1 (i) via a direct and wireless connection (tuner wireless connection) or (ii) via the wireless access point 4 (wireless access point connection). That is, while either one of these connections is being employed, the display-end path switching section 50 causes the wireless communication IF be activated.

The wired communication IF 43 is an interface for wired communication, and includes a LAN port. A connection between the display section 2 and the LAN is realized by connecting the display section 2 with the router 3 via the wired communication IF 43 with the use of a LAN cable. The wired communication IF 43 is put to use during a LAN cable connection. Specifically, the display-end path switching section 50 causes the wired communication IF 43 to be activated while the LAN cable connection is being employed.

The displaying section 44 displays images under control of the display control section 40. The displaying section 44 displays (i) an image which was broadcast via digital broadcasting, (ii) information obtained from the Internet, (iii) a guide screen on which the image display system 100 is set, and the like.

The remote control signal receiving section 45 (i) receives a signal which has been transmitted from a remote control (not illustrated) that operates the image display system 100, (ii) generates a control signal corresponding to the signal thus received, and then (iii) supplies the control signal to the display control section 40.

The router 3 is a device that forwards information transmitted within the image display system 100. The router 3 has a wired connection to the tuner section 1 and is connected to the Internet. The router 3 is also connected wirelessly to the wireless access point 4. This is how the router 3 can be connected to the LAN. Any broadband router in general can be used as the router 3, and the wireless access point 4 can also be a general one.

[Image Transmission Path for Each Connection Type]

Next, an image transmission path for each connection type will be described with reference to FIG. 2. FIG. 2 is a view illustrating image transmission paths for respective connection types according to the image display system 100. Note that (a) through (c) of FIG. 2 correspond to the respective signs (a) through (c) illustrated in FIG. 1.

(Tuner Wireless Connection)

According to the tuner wireless connection illustrated in (a) of FIG. 2, the tuner section 1 and the display section 2 are wirelessly connected. The tuner section 1 is connected to the router 3, and the router 3 is connected to the Internet. A wireless IF (wireless communication IF 14) is activated on the tuner section 1, and a wireless IF (wireless communication IF 42) is also activated on the display section 2.

According to such a connection type, (i) a digital terrestrial broadcast image signal, which is outputted from the tuner section 1, is directly and wirelessly transmitted to the display section 1 and (ii) information obtained from the Internet is transmitted from the router 3 to the tuner section 1, and is then wirelessly transmitted from the tuner section 1 to the display section 1.

(Wireless Access Point Connection)

According to the wireless access point connection illustrated in (b) of FIG. 2, the wireless access point 4 and the display section 2 are wirelessly connected. The tuner section 1 is connected to the router 3, and the router 3 is connected to the Internet. A LAN port (of the wired communication IF 15) is activated on the tuner section 1, and a wireless IF (wireless communication IF 42) is activated on the display section 2.

According to such a connection type, (i) a digital terrestrial broadcast image signal, which is outputted from the tuner section 1, is transmitted to the router 3, and is then transmitted, via the wireless access point 4, to the display section 1 and (ii) information obtained from the Internet is transmitted from the router 3 to the display section 1 via the wireless access point 4.

(LAN Cable Connection)

According to the LAN cable connection illustrated in (c) of FIG. 2, the display section 2 and the router 3 are connected via the wired LAN. The tuner section 1 is connected to the router 3, and the router 3 is connected to the Internet. A LAN port (of the wired communication IF 15) is activated on the tuner section 1, and a LAN port (of the wired communication IF 43) is also activated on the display section 2.

According to such a connection type, (i) a digital terrestrial broadcast image signal, which is outputted from the tuner section 1, is transmitted to the router 3, and is then transmitted, via the wireless access point 4, to the display section 1 and (ii) information obtained from the Internet is transmitted from the router 3 to the display section 1 via a LAN cable.

[Steps of Switching Between Connection Types]

Figure 3:
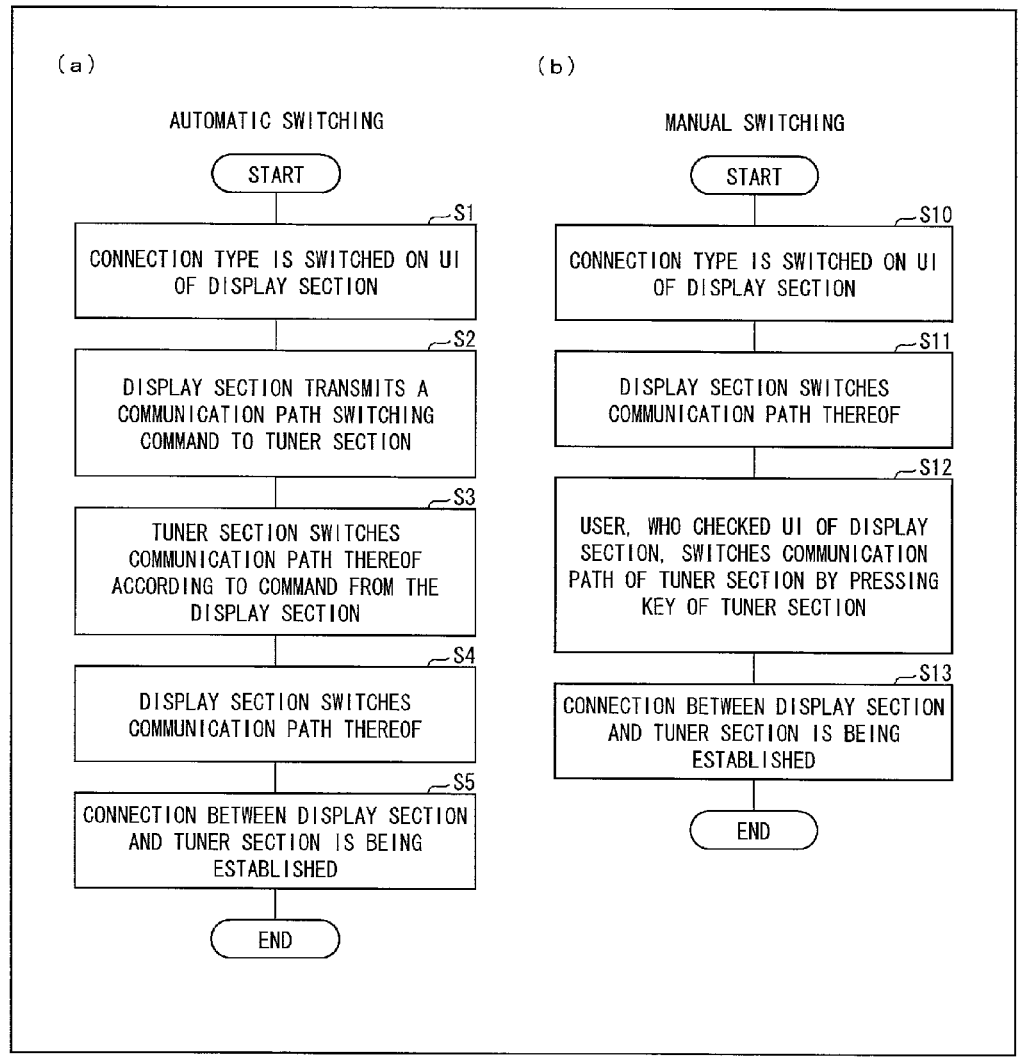
FIG. 3 is a set of flow charts (a) and (b) illustrating steps involved in switching a connection type in accordance with the image display system, (a) of FIG. 3 illustrating the steps involved in automatic switching and (b) of FIG. 3 illustrating the steps involved in manual switching.

Next, steps of switching between the connection types within the image display system 100 will be described with reference to FIG. 3. FIG. 3 is a flow chart illustrating the steps of switching between the connection types with in the image display system 100. (a) of FIG. 3 illustrates steps of automatic switching, and (b) of FIG. 3 illustrates steps of manual switching.

(Automatic Switching)

According to the automatic switching illustrated in (a) of FIG. 2, a user operation to command automatic switching between the connection types is received via a UI of the display section 1 (S1). Note that the user operation is received by the remote control signal receiving section 45.

The display section 2, which has received the user operation to command the automatic switching, transmits a connection path switching command to the tuner section 1 (S2). Specifically, the tuner commanding section 51 of the display section 2 transmits, to the tuner section 1, a command that instructs making a switch to a connection type that corresponds to the user operation received by the remote control signal receiving section 45. Note that the command is transmitted to the tuner section 1 via a transmission path that corresponds to a connection type which was being employed before the switching.

Next, in accordance with the connection path switching command thus received, the tuner section 1 switches its connection path (S3). More specifically, the tuner-end path switching section 20 switches the connection path of the tuner section 1. The display section 1 also switches its connection path (S4). More specifically, the display-end path switching section 50 switches the connection path of the display section 2.

Then, between the tuner section 1 and the display section 2, communication is established via a connection path to which the switch has been made (S5), and thus the switching of connection type is completed. Note that the establishment of the communication via the communication path after the switching is executed by the tuner-end connection processing section 21 and the display-end connection processing section 52.

(Manual Switching)

According to the manual switching illustrated in (b) of FIG. 3, a user operation to command manual switching between the connection types is received via the UI of the display section 1 (S10). Note that the user operation is received by the remote control signal receiving section 45.

The display section 2, which has received the user operation to command the manual switching, switches its communication path (S11). Specifically, the display-end path switching section 50 switches the communication path of the display section 2. In addition, the display-end path switching section 50 causes the displaying section 44 to display a UI image that prompts a user to switch the communication path of the tuner section 1.

Then, the user, who has been prompted by the UI image, presses a key(s) of the tuner section 1 (i.e. carries out an operation on the input section 12) so that the communication path of the tuner section 1 is switched (S12). Specifically, the tuner-end path switching section 20 of the tuner section 1 makes a switch to a connection type that corresponds to the operation carried out on the input section 12. Note that the operation to press the key(s) will be described later.

Subsequently, between the tuner section 1 and the display section 2, communication is established via the communication path to which the switching has been made (S5), and thus the switching of the connection type is completed. Note that the establishment of the communication via the communication path after the switching is executed by the tuner-end connection processing section 21 and the display-end connection processing section 52.

(Key-Pressing Operation for Switching)

An example of the key-pressing operation for switching the communication path of the tuner section 1 will be described below with reference to FIG. 4. FIG. 4 is a view illustrating external appearances of the input section 12 and the information presenting section 13 of the tuner section 1.

FIG. 4 shows an example in which the tuner section 1 includes (i), as an input section 12, a combination of two buttons which are a power button 12a and a LINK button 12b and (ii), as an information presenting section 13, a combination of two buttons which are a power/recording program lamp 13a and a WIRELESS lamp 13b.

The power button 12a is a button for switching between the powered-ON state and the powered-OFF state of the tuner section 1, and is a button to be used also for switching between communication paths. That is, pressing the power button 12a while pressing the LINK button 12b can alternate between a wireless communication path and a wired communication path (LAN port), that is, alternately activate a wireless communication IF and a wired communication IF.

In a case where the wireless communication path is selected (the wireless communication IF 14 is activated), the WIRELESS lamp 13b is turned on. In contrast, in a case where the wired communication path is selected (the wired communication IF 15 is activated), the WIRELESS lamp 13b is turned off. This allows the user to recognize which connection path is activated.

The power/recording program lamp 13a is a lamp for indicating (i) whether the tuner section 1 is powered on or off and (ii) a status in regard to recording of an image. Specifically, the power/recording program lamp 13a is turned on while the power of the tuner section 1 is on, whereas the power/recording program lamp 13a is turned off while the power of the tuner section 1 is off. In addition, while the tuner section 1 is in a process of programming the recording, the power/recording program lamp 13a is turned on with the use of a color indicative of such a programming state. Furthermore, while the tuner section 1 is in a standby state, the power/recording program lamp 13a is turned on with the use of a color indicative of the standby state.

Of course, an interface of the tuner section 1 for switching between connection paths is not limited to that described in the example. In fact, any interface can be applicable, provided that the interface is capable of receiving a user operation that commands the switching.

[Configuration Example of UI Screen]

Figure 5:
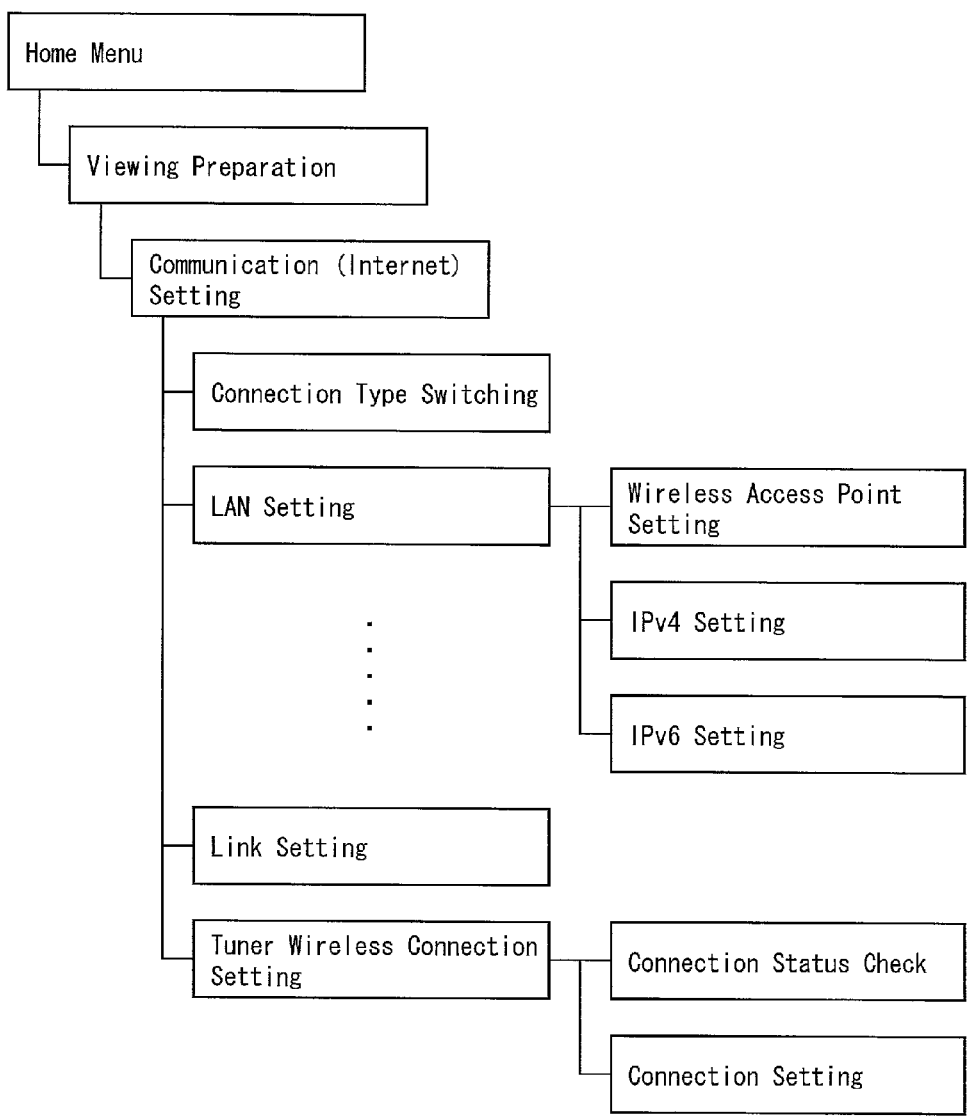
FIG. 5 is a view illustrating a configuration of a UI screen in accordance with the image display system.

According to the image display system 100, the switching of connection type is achieved by causing a user to follow the UI screen that is displayed on the display section 2. The UI screen is, specifically, configured to be displayed as illustrated in FIG. 5. FIG. 5 is a view showing a configuration example of the UI screen.

As illustrated in FIG. 5, the UI screen is configured to transition according to a hierarchical structure, and "Home Menu" is prepared as a first UI screen. The UI screen may transition from "Home Menu" to "Viewing Preparation", and from "Viewing Preparation" to "Communication (Internet) Setting."

Then, the "Communication (Internet) Setting" UI screen contains such items as "Connection Type Switching", "LAN Setting", "Link Setting", and "Tuner Wireless Connection Setting."

In a case where "Connection Type Switching" is selected, the display section 2 displays a UI screen on which one of the aforementioned three connection types is to be selected. In a case where a user should not be allowed to switch between connection types due to a system-related reason, "Connection Type Switching" is configured to be unselectable. For example, in a case where the connection type is switched while the image display system 100 is accessing the Internet, the access to the Internet is temporarily suspended, and then it may be difficult to resume displaying an image which was left incompletely displayed. Therefore, "Connection Type Switching" is configured to be unselectable while the image display system 100 is accessing the Internet. In addition, while an image is being recorded, the tuner section 1 is undergoing a large processing load. Therefore, a recording error may occur in a case where the connection type is switched during the recording. Hence, "Connection Type Switching" is configured to be unselectable while the tuner section 1 is executing image recording or programming of the image recording.

In a case where "LAN Setting" is selected, the display section 2 displays a UI screen on which one of "Wireless Access Point Setting", "IPv4 Setting", and "IPv6 Setting" is to be selected. Of such three items, "Wireless Access Point Setting" is to be carried out only in a case where the wireless access point connection is employed as a connection type. Therefore, "Wireless Access Point Setting" is configured to be unselectable while the other connection types are being employed.

In a case where "Link Setting" is selected, a link between the tuner section 1 and the display section 2 is set up (i.e. pairing is carried out). According to the present example, selection of "Link Setting" causes a link to be set up with the use of the tuner wireless connection as a connection type. This makes it easy to resume activity such as viewing digital broadcasting or connecting to the Internet in a case where such activity has been disabled due to an improper setting of the connection.

Note that the link setting is a part of initial setting that is carried out when the use of the image display system 100 is initiated. In other words, the pairing of the tuner section 1 and the display section 2 is carried out by carrying out the initial setting. The "Link Setting" item is provided in preparation for a case where the communication between the tuner section 1 and the display section 2 is disabled due to activity such as a change made to the connection setting after the initial setting has been completed. Furthermore, the link setting is also carried out in cases where (i) pairing information has been lost due to some type of malfunction, (ii) there arises a need for re-pairing due to a change that has been made to a MAC address of an IF (which MAC address serves as a basis for the pairing information) as a result of an incident such as replacement of a part(s) of the wireless communication IF 42, (iii) there is a demand for changing a connection target, given that there are a plurality of pairs of a tuner section 1 and a display section 2, and (iv) the like.

In a case where "Tuner Wireless Connection Setting" is selected, the display section 2 displays a UI screen on which one of the following items is to be selected: (i) "Connection Status Check" for examining a connection status of a tuner wireless connection (the status of the connection between the tuner section 1 and the display section 2) and (ii) "Connection Setting" for setting up a connection via the tuner wireless connection (connection between the tuner section 1 and the display section 2). Note that "Connection Status Check" and "Connection Setting" are to be carried out only in a case where the tuner wireless connection is employed as a connection type. Therefore, "Tuner Wireless Connection Setting" is configured to be unselectable while the other connection types are being employed.

[Link Setting]

Figure 6:
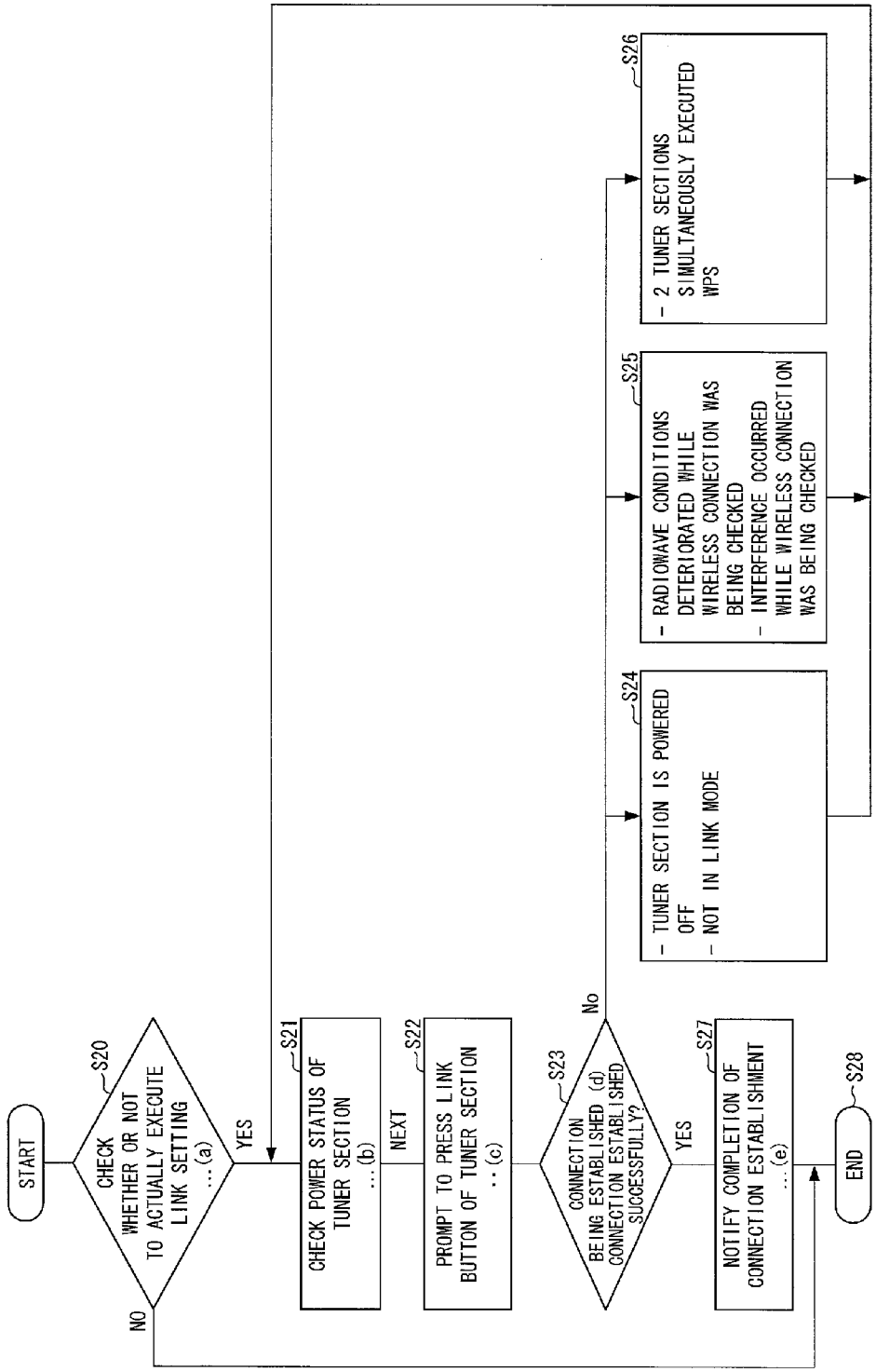
FIG. 6 is a flow chart illustrating respective operations of the tuner, section and a display section during "Link Setting" of the image display system.

How the tuner section 1 and the display section 2 carry out "Link Setting" will be described below with reference to FIGS. 6 and 7. FIG. 6 is a flow chart illustrating how the tuner section 1 and the display section 2 carry out "Link Setting." FIG. 7 is a view illustrating screens to be displayed while the tuner section 1 and the display section 2 carry out "Link Setting."

Figure 7:
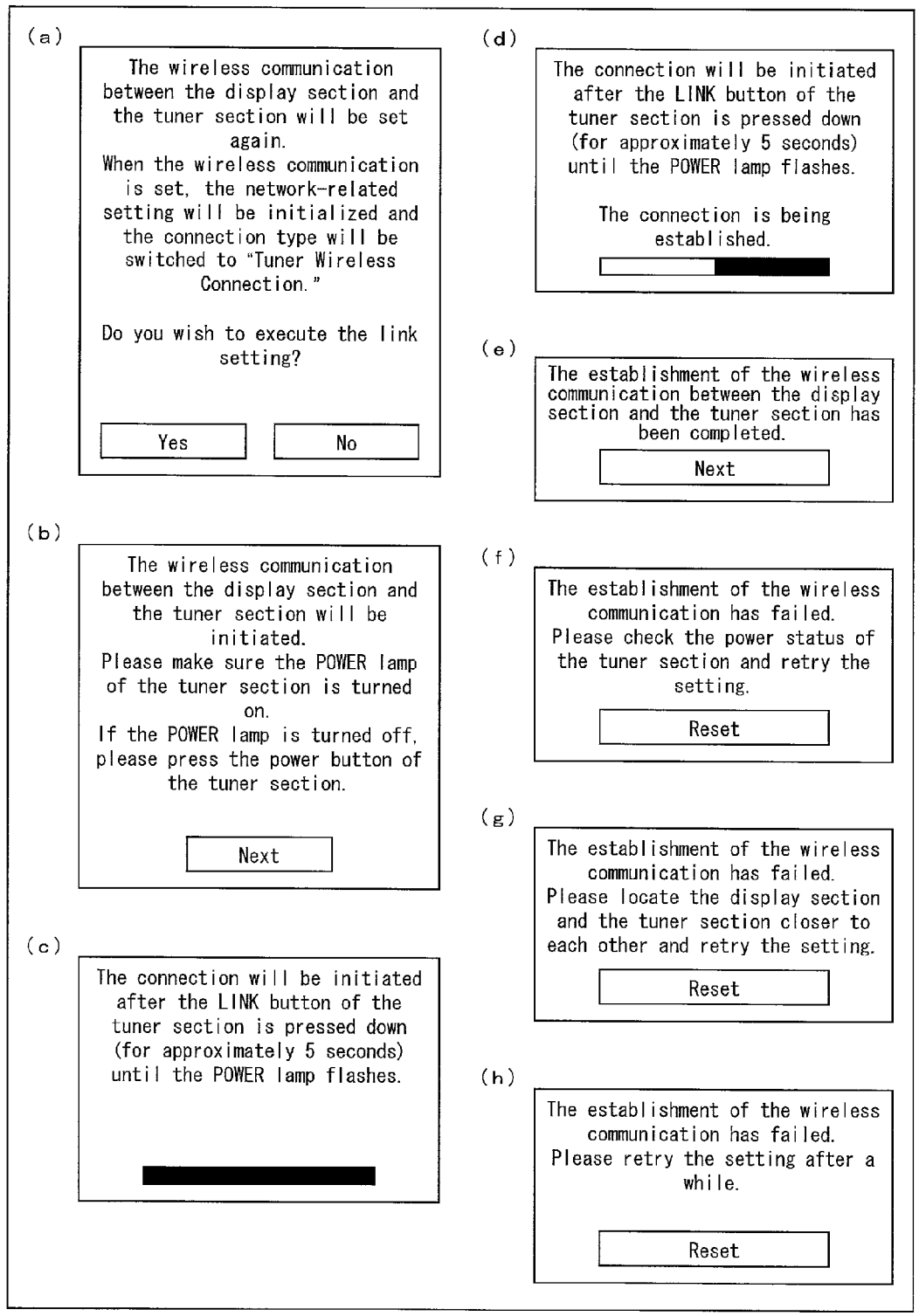
FIG. 7 is a view illustrating screens to be displayed during the operations illustrated in FIG. 6.

When the remote control signal receiving section 45 receives a user operation to select "Link Setting", the display-end path switching section 50 causes the displaying section 44 to display a screen illustrated in (a) of FIG. 7, so as to confirm that a user actually intends to carry out the link setting (S20).

According to the example of (a) of FIG. 7, the screen shows (i) the details of the link setting and (ii) that the link setting causes the connection type to be switched to the tuner wireless connection. The screen also shows "Yes" and "No" options to be selected for confirming whether or not to carry out the link setting.

In a case where "No" is selected on the screen, "Link Setting" is terminated. On the other hand, in a case where "Yes" is selected, the display-end path switching section 50 causes the displaying section 44 to display a screen illustrated in (b) of FIG. 7, which screen prompts the user to confirm that the tuner section 1 is powered on (S21).

According to the example of (b) of FIG. 7, the screen shows that (i) initiation of wireless connection between the display section 2 and the tuner section 1 will be followed and (ii) the tuner section 1 needs to be powered on. Furthermore, the screen also shows "Next" option for proceeding to a next step.

In a case where "Next" is selected, the display-end path switching section 50 prompts the user to press the LINK button 12b (see FIG. 4) of the tuner section 1 (S22). Specifically, the display-end path switching section 50 causes the displaying section 44 to display a screen illustrated in (c) of FIG. 7. In addition, the display-end path switching section 50 commands the display-end connection processing section 52 to execute pairing of the tuner section 1 and the display section 2.

According to the example of (c) of FIG. 7, the screen shows a method of operation of the LINK button 12b, which operation is required for initiating the connection. The screen also shows a status bar indicative of progress in connection status. In a case where the tuner section 1 receives an input operation in accordance with the method, the tuner-end connection processing section 21 initiates the pairing with the display-end connection processing section 52.

Then, the link setting process proceeds to a step S23, and the tuner section 1 and the display section 2 get into a state in which to wait for the connection to be established. During the step S23, the display-end connection processing section 52 replaces the screen illustrated in (c) of FIG. 7 with a screen illustrated in. (d) of FIG. 7. On the screen illustrated in (d) of FIG. 7, (i) it is indicated that the connection is being established and (ii) a status bar is updated according to the progress in connection status.

Note that the pairing involves exchange of information such as (i) MAC addresses of both ends, (ii) addresses (static IP addresses obtained during the establishment of connection to a network) of both ends, which IP addresses are used for establishing a wireless connection. The information is then stored in the communication setting storage section 30 and in the communication setting storage section 60. Then, successful pairing results in establishment of wireless communication.

In a case where the connection is successfully established (YES in S23), the display-end connection processing section 52 causes a screen illustrated in (e) of FIG. 7 to be displayed so as to notify the user that connection establishment has been completed. According to the example of (e) of FIG. 7, the screen (i) indicates that the establishment of the wireless connection between the display section 2 and the tuner section 1 has been completed and (ii) shows "Next" option for proceeding to a next step. Then, in a case where "Next" is selected, the link setting is ended. Alternatively, it is also possible to proceed to a next item after the link setting is ended.

On the other hand, in a case where the establishment of the connection fails (NO in S23), the display section 2 displays different screens, depending on a cause of the failure. Specifically, in a case where the connection establishment is not initiated after a predetermined length of time (e.g. 2 minutes) has elapsed, the display-end connection processing section 52 judges that the tuner section 1 is powered off or that the image display system 100 is not in a LINK mode (S24). Then, the display-end connection processing section 52 a screen illustrated in (f) of FIG. 7 to be displayed so as to notify the user accordingly.

According to the example of (f) of FIG. 7, the screen (i) indicates that the connection establishment has failed and (ii) prompts the user to confirm that the tuner section 1 is powered on. The screen also shows "Reset" option for initiating the link setting again. In a case where "Reset" is selected, the link setting process returns to the step S21.

In a case where the connection establishment is initiated within the predetermined length of time but is interrupted without being completed, the display-end connection processing section 52 (i) judges that radio wave conditions have deteriorated or that transmission of radio waves is interfered with (S25) and then (ii) causes a screen illustrated in (g) of FIG. 7 to be displayed so as to notify the user accordingly.

According to the example of (g) of FIG. 7, the screen shows that the connection establishment has failed, and requests that the tuner section 1 and the display section 2 be located closer to each other. The screen also shows "Reset" option for initiating the link setting again. In a case where "Reset" is selected, the link setting process returns to the step S21. Note that, in this case, the tuner section 1 is presumably powered on, and the link setting process may therefore return to the step S22.

In a case where two (or more) tuner sections 1 simultaneously execute WPS (Wi-Fi Protected Setup), the display-end connection processing section 52 determines that the connection establishment has failed (S26), and then causes a screen illustrated in (h) of FIG. 7 to be displayed so as to prompt the user to attempt the link setting again.

According to the example of (h) of FIG. 7, the screen (i) indicates that the connection establishment has failed and (ii) requests that the link setting be attempted again after a period of time has elapsed. The screen also shows "Reset" option is for initiating the link setting again. In a case where "Reset" is selected, the link setting process returns to the step S21. Note that, in this case, the tuner section 1 is presumably powered on, and the link setting process may therefore return to the step S22.

[Switching of Connection Type (Tuner Wireless Connection)]

Figure 9:
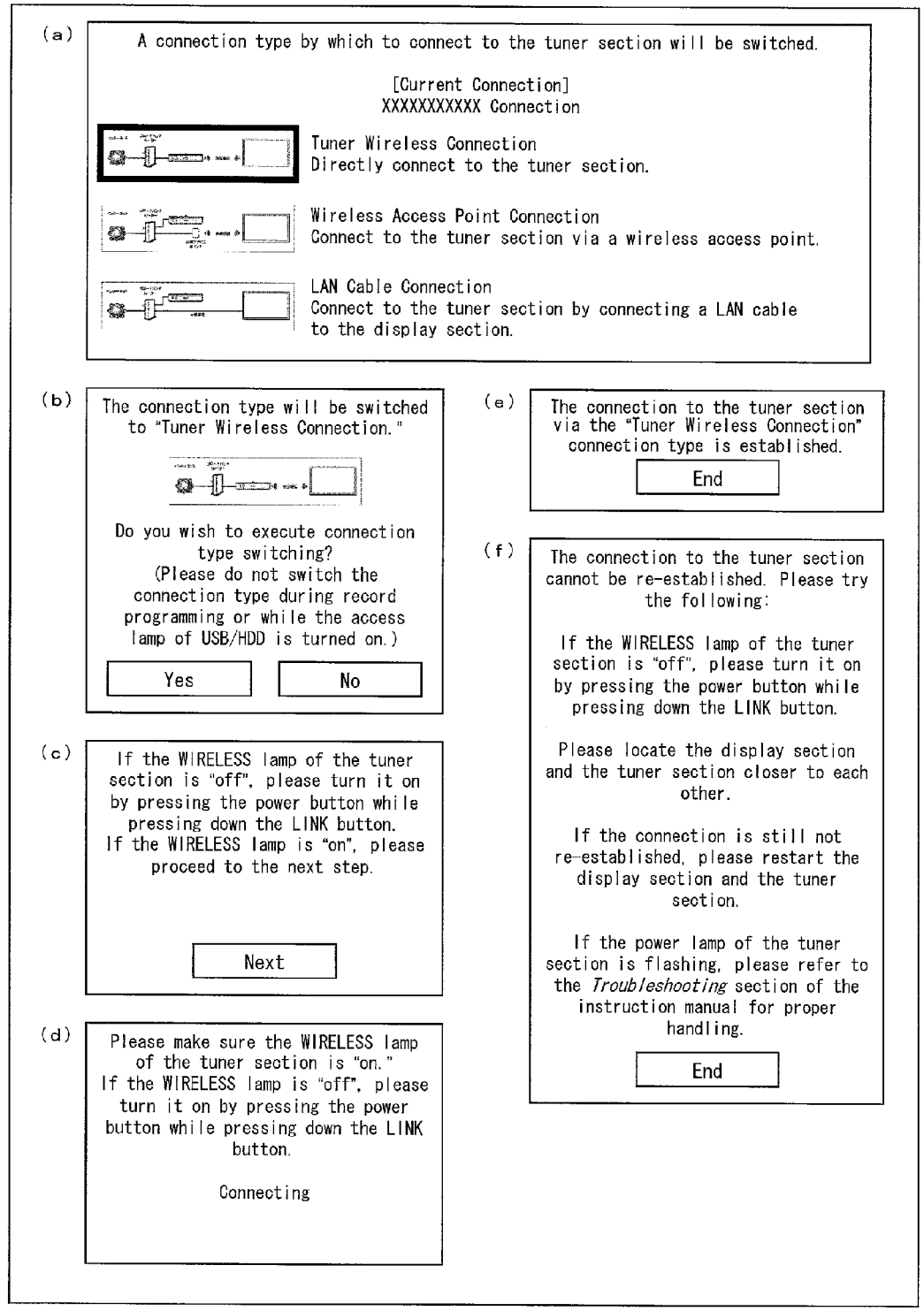
FIG. 9 is a view illustrating screens to be displayed during the operations illustrated in FIG. 8.

Next, how the tuner section 1 and the display section 2 operate when the connection type is switched to the tuner wireless connection will be described below with reference to FIGS. 8 and 9. FIG. 8 is a flow chart illustrating how the tuner section 1 and the display section 2 operate when the connection type be switched to a wireless connection. FIG. 9 is a view illustrating screens to be displayed during the operation illustrated in FIG. 8.

When "Switch Connection Type" is selected in the example of FIG. 5, the display-end path switching section 50 displays, for example, a screen illustrated in (a) of FIG. 9, which screen prompts a user to select a connection type (S30). In this example, the tuner wireless connection is to be selected.

According to the example of (a) of FIG. 9, the screen shows (i) an indication that the connection type is to be switched, (ii) a connection type that is being currently employed, (iii) a view schematically showing connection type options, and (iv) descriptions of the connection type options. The view shows a cursor for selecting the connection type options.

In a case where the tuner wireless connection is selected on the screen of (a) of FIG. 9, the display-end path switching section 50 displays a screen illustrated in (b) of FIG. 9, so as to confirm that the user actually intends to switch the connection type (S31).

According to the example of (b) of FIG. 9, the screen shows (i) an indication that the connection type is to be switched to the tuner wireless connection, (ii) a view schematically showing the tuner wireless connection, (iii) a message asking whether or not to switch to the tuner wireless connection, and (iv) cautions to pay attention to when a switch is to be made to the tuner wireless connection. The screen also shows "Yes" and "No" options to be selected for confirming whether or not to carry out the switch to the tuner wireless connection. In a case where "No" option is selected, the operation to switch the connection type ends without switching to the tuner wireless connection.

On the other hand, in a case where "Yes" is selected, the display-end path switching section 50 switches a communication path to "wireless" (S32). Specifically, the display-end path switching section 50 activates communication via the wireless communication IF 42, and deactivates communication via the wired communication IF 43. Then, the display-end path switching section 50 commands the display-end connection processing section 52 to initiate establishment of a wireless connection to the tuner section 1.

Then, in order for the communication path of the tuner section 1 to be switched to "wireless", the display-end path switching section 50 causes a screen illustrated in (c) of FIG. 9 to be displayed (S33). According to the example of (c) of FIG. 9, the screen shows (i) steps involved in switching the communication path of the tuner section 1 to "wireless" and (ii) an indication that the WIRELESS lamp 13b (see FIG. 4) is turned on in a case where the communication path of the tuner section 1 is set to "wireless." The screen also shows "Next" option to be selected for proceeding to a next step.

When an operation is executed to switch to "wireless", the tuner-end path switching section 20 (i) activates communication via the wireless communication IF 14 and (ii) deactivates communication via the wired communication IF 15. In addition, the tuner-end path switching section 20 commands the tuner-end connection processing section 21 to initiate establishment of a wireless connection to the display section 2. Note that, since the pairing of the tuner section 1 and the display section 2 has already been executed in this example, the tuner-end connection processing section 21 and the display-end connection processing section 52 initiate establishment of the wireless connection in accordance with connection settings which are read out from the communication setting storage section 30 and the communication setting storage section 60, respectively.

Then, in a case where "Next" is selected, the display-end path switching section 50 goes into a standby state (S34), and causes a screen illustrated in (d) of FIG. 9 to be displayed. According to the example of (d) of FIG. 9, the screen shows (i) steps involved in switching the communication path of the tuner section 1 to "wireless", (ii) an indication that the WIRELESS lamp 13b is turned on in a case where the communication path of the tuner section 1 is set to "wireless", and (iii) an indication that the wireless connection is being established.

In a case where the connection is successfully established in the step S34, the connection type switching operation proceeds to a step S35 in which a screen indicative of success in connection establishment is displayed. The screen can be, for example, displayed as illustrated in (e) of FIG. 9. According to the example of (e) of FIG. 9, the screen shows an indication that a connection to the tuner section 1 is established via the tuner wireless connection. The screen also shows "End" option to be selected for ending the connection type switching operation. When "End" option is selected, (i) the connection type switching operation ends and returns to the step S30 and (ii) the screen illustrated in (a) of FIG. 9 is displayed again.

On the other hand, in a case where the connection establishment fails in the step S34, the connection type switching operations proceeds to a step S36 in which a screen indicative of failure of connection establishment is displayed. The screen can be, for example, displayed as illustrated in (f) of FIG. 9. According to the example of (f) of FIG. 9, the screen shows (i) an indication that the connection establishment has failed and (ii) steps involved in solving the problem. The screen also shows "End" option to be selected for ending the connection type switching operation. When "End" option is selected, (I) the connection type switching operation ends and returns to the step S30 and (II) the screen illustrated in (a) of FIG. 9 is displayed again.

Note that, in a case where the establishment of the tuner wireless connection fails, the display section 2 is set to connect to the tuner section 1 via a wireless communication, and is not set to connect to the router 3 or the wireless access point 4. Therefore, in such a case, it is not possible to view digital broadcasting or to connect to the Internet.

[Switching of Connection Type (Wireless Access Point Connection)]

Figure 10:
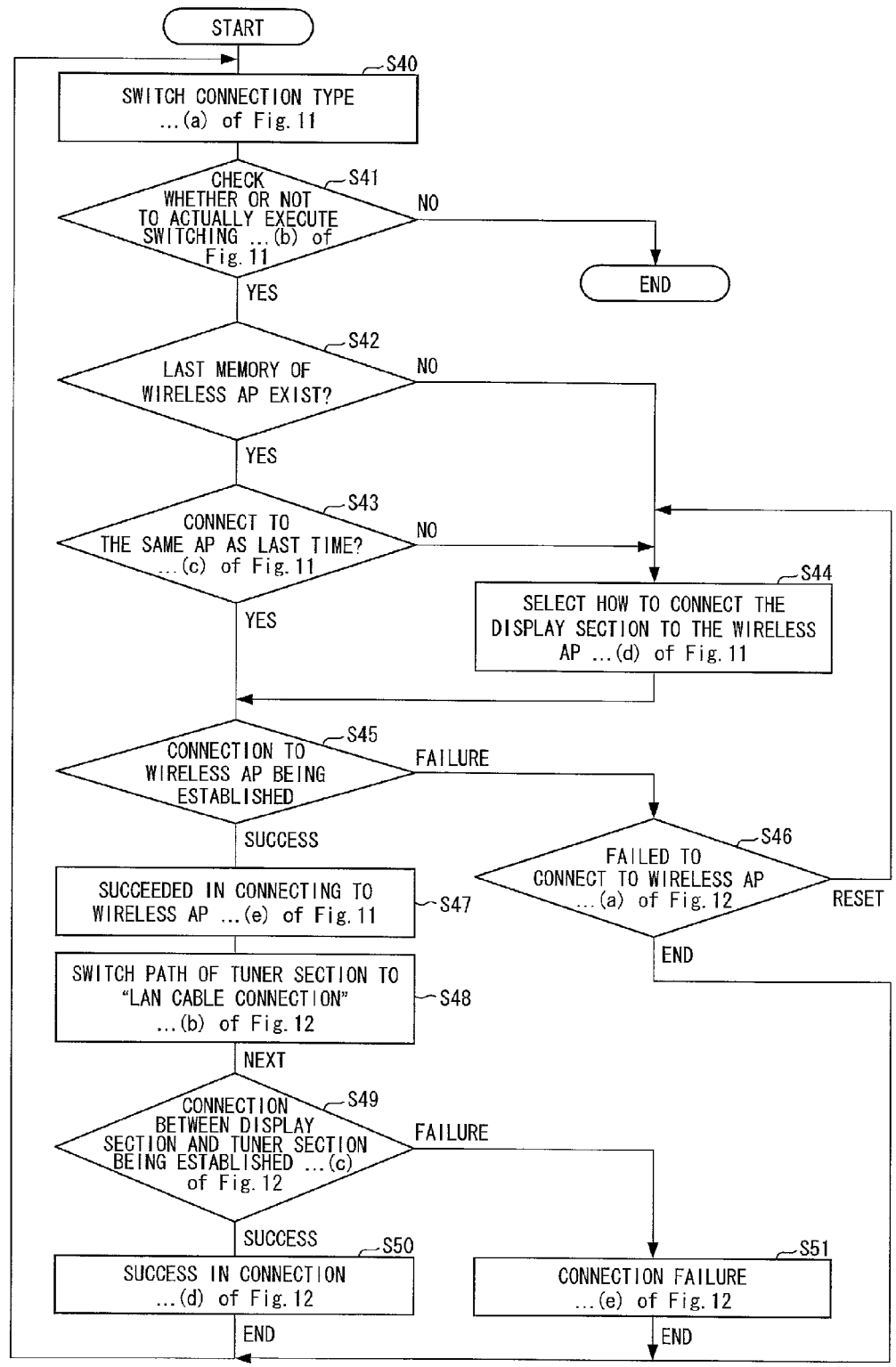
FIG. 10 is a flow chart illustrating respective operations of the tuner section and the display section for switching a connection type to a wireless access point connection.
Figure 12:
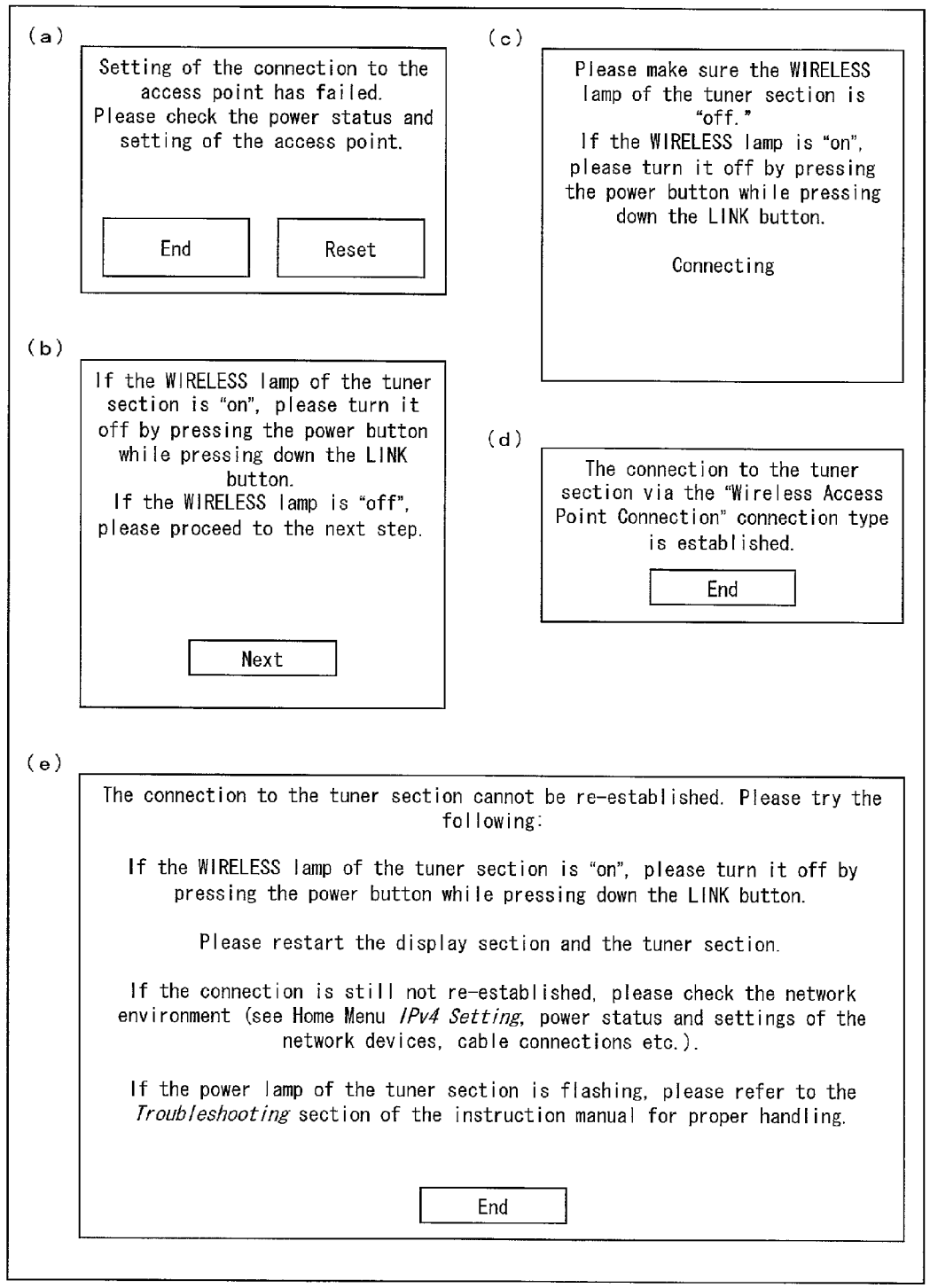
FIG. 12 is a view illustrating other screens to be displayed during the operations illustrated in FIG. 10.

Next, how the tuner section 1 and the display section 2 operate when the connection type is switched to the wireless access point connection will be described below with reference to FIGS. 10 through 12. FIG. 10 is a flow chart illustrating how the tuner section 1 and the display section 2 operate when the connection type is to be switched to the wireless access point connection. FIGS. 11 through 13 illustrate screens to be displayed during the operation illustrated in FIG. 10.

As in the example of FIG. 8, the operation to switch to the wireless access point connection is initiated by displaying the screen illustrated in (a) of FIG. 11 which screen prompts a user to select the connection type (S40). The screen is similar to that illustrated in (a) of FIG. 9, and therefore will not be described. In this example, the wireless access point connection is to be selected.

In a case where the wireless access point connection is selected, the display-end path switching section 50 displays a screen illustrated in (b) of FIG. 11, so as to confirm that the user actually intends to switch to the wireless access point connection (S41). Note that the description of (b) of FIG. 11 will be omitted since (b) of FIG. 11 is similar to (b) of FIG. 9 except that the connection type is intended to be switched to the wireless access point connection.

In a case where "No" option is selected on the screen illustrated in (b) of FIG. 11, the connection type switching operation ends without switching to the tuner wireless connection. On the other hand, in a case where "Yes" option is selected, the display-end path switching section 50 examines whether or not there exists a last memory of a wireless AP (access point) (S42). Specifically, the display-end path switching section 50 examines whether or not communication settings, which were used when the display section 2 was previously connected to the wireless access point 4, are stored in the communication setting storage section 60 of the display storage section 41.

In a case where the existence of the last memory is confirmed (YES in S42), the display-end path switching section 50 causes a screen illustrated in (c) of FIG. 11 to be displayed so as to ask the user whether or not to connect to a wireless access point that was previously used.

According to the example of (c) of FIG. 11, the screen shows (i) a message asking whether or not to connect to the wireless access point that was previously used and (ii) "Yes" and "No" options to be selected for confirming whether or not to connect to the wireless access point. The screen also shows information (SSID, security type, and security key) for specifying the wireless access point.

In a case where "Yes" option is selected on the screen illustrated in (c) of FIG. 11, the display-end path switching section 50 commands the display-end connection processing section 52 to establish a connection to the wireless access point. This causes the display section 2 to be in a state in which the connection to the wireless access point is being established (S45).

On the other hand, in a case where "No" option is selected on the screen illustrated in (c) of FIG. 11 or where the existence of the last memory is not confirmed in the step S42 (NO in S42), a screen illustrated in (d) of FIG. 11 is displayed so as to prompt the user to select how the display section 2 should connect to a wireless access point.

According to the example of (d) of FIG. 11, the screen shows three options which are (i) "WPS" for selecting a wireless access point that is compatible with WPS, (ii) "Access Point Selection" for selecting, out of any given wireless access points, a wireless access point to connect to, and (iii) "Access Point Registration" for manually setting a wireless access point to connect to.

In a case where "WPS" is selected on the screen illustrated in (d) of FIG. 11, the display-end connection processing section 52 initiates establishment of a connection to a WPS-compatible wireless access point with the use of WPS. Then, the switching operation proceeds to the step S45.

In a case where "Access Point Selection" is selected on the screen illustrated in (d) of FIG. 11, the display-end path switching section 50 causes a list of available wireless access points to be displayed, and then the display-end connection processing section 52 initiates establishment of a connection to a selected wireless access point. Then, the switching operation proceeds to the step S45.

In a case where the selected wireless access point is an unsecured one, a screen illustrated in (a) of FIG. 13 is displayed. According to the example of (a) of FIG. 13, the screen shows (i) an indication that an unsecured wireless access point has been selected and (ii) an indication that the selection of such an unsecured wireless access point will result in inability to connect to the tuner section 1. The screen also shows (iii) a message prompting the user to confirm whether or not to connect to the unsecured wireless access point and (iv) "Yes" and "No" options to be selected for confirming whether or not to connect to the unsecured wireless access point. In a case where "Yes" is selected on the screen illustrated in (a) of FIG. 13, the switching operation proceeds to the step S45. In a case where "No" option is selected, the switching operation returns to the screen showing the list of the available wireless access points.

In a case where "Access Point Registration" is selected on the screen illustrated in (d) of FIG. 11, the display-end path switching section 50 causes a screen for registration of an access point to be displayed so as to cause the user to register the wireless access point to which a connection is to be established. Then, the display-end connection processing section 52 initiates establishment of the connection to the wireless access point thus registered. Then, the switching operation proceeds to the step S45.

Note that in a case where the wireless access point is to be manually registered, a screen illustrated in (b) of FIG. 13 is to be displayed so as to cause the user to input (i) the wireless access point to be registered and (ii) a security type. According to the example of (b) of FIG. 13, the screen shows (I) a message prompting the user to input a security type and (II) security type options to be selected from, which are "WEP", "WPA", "WPA2", and "None." In a case where the connection to an unsecured wireless access point is established, the screen shows an indication that no connection can be made to the tuner section 1.

In a case where the connection establishment fails in the step S45, a screen illustrated in (e) of FIG. 11 is displayed so as to (i) notify the user that the connection establishment has failed and (ii) cause the user to select whether to attempt setting the connection again or end the connecting setting (S46). According to the example of (e) of FIG. 11, the screen shows (I) an indication that the connection establishment has failed, (II) suggestions concerning the problem, and (III) "Reset" and "End" options for prompting the user to select whether to attempt setting the connection again or end the connecting setting. In a case where "Reset" option is selected on the screen, the switching operation returns to the step S44. In a case where "End" option is selected, the switching operation returns to the step S40.

On the other hand, in a case where the connection is successfully established in the step S45, a screen illustrated in (a) of FIG. 12 is displayed so as to notify the user that the connection has been successfully established (S47). Since the connection to the wireless access point 4 is successfully established, the display section 2 is connected to the LAN. At this point, however, the establishment of the connection to the tuner section 1 is not yet completed.

According to the example of (a) of FIG. 12, the screen shows (i) an indication that the connection has been successfully established and (ii) information for specifying which wireless access point the display section 2 is connected to (i.e. SSID, security type, security key). The screen also shows "Next" option to be selected for proceeding to a next step.

When "Next" option is selected on the screen, the display-end path switching section 50 causes a screen illustrated in (b) of FIG. 12 to be displayed so that the connection path of the tuner section 1 is switched to "LAN port" (S48). According to the example of (b) of FIG. 12, the screen shows (i) steps involved in switching the communication path of the tuner section 1 to "LAN port", (ii) an indication that, when the communication path of the tuner section 1 is set to "LAN port", the WIRELESS lamp 13b (see FIG. 4) is turned off. The screen also shows "Next" option to be selected for proceeding to a next step.

When an operation is executed to switch the communication path to "LAN port", the tuner-end path switching section 20 (i) activates communication via the wired communication IF 15 and (ii) commands the tuner-end connection processing section 21 to initiate establishment of a connection to the display section 2.

Then, when "Next" option is selected, the establishment of the connection is being established (S49), and a screen illustrated in (c) of FIG. 12 is displayed. According to the example of (c) of FIG. 12, the screen shows (i) steps involved in switching the communication path of the tuner section 1 to "LAN port", (ii) an indication that, when the communication path of the tuner section 1 is set to "LAN port" (when the wired communication IF 15 is activated), the WIRELESS lamp 13b is turned off, and (iii) an indication that the connection is being established. Activation of the wired communication IF 15 allows for a communication path between the tuner section and the display section 2. This causes the tuner-end connection processing section 21 and the display-end connection processing section 52 to communicate with each other via the communication path, and thus the communication is established.

Although not illustrated in FIG. 10, selection of "Next" option causes timeout count to be initiated while the connection is being established between the display section 2 and the tuner section 1. Note that, in a case where the connection is established while the screen illustrated in (c) of FIG. 12 is being displayed, the switching operation proceeds to a step S50 without waiting for "Next" option to be selected.

In a case where the connection is successfully established in the step S49, the switching operation proceeds to the step S50 in which a screen indicative of successful establishment of the connection is to be displayed. Such a screen can be a screen illustrated in (d) of FIG. 12. According to the example of (d) of FIG. 12, the screen shows an indication that the connection to the tuner section 1 has been established via the wireless access point connection. The screen also shows "End" option to be selected for ending the connection type switching operation. When "End" option is selected, the connection type switching operation ends and then returns to the step S40 in which the screen illustrated in (a) of FIG. 11 is displayed.

On the other hand, in a case where the connection establishment fails in the step S49, the switching operation proceeds to a step S51 in which a screen indicative of the failure of the connection establishment is to be displayed. Such a screen can be a screen illustrated in (e) of FIG. 12. According to the example of (e) of FIG. 12, the screen shows (i) an indication that the connection establishment has failed and (ii) steps involved in solving the problem. The screen also shows "End" option to be selected for ending the switching operation. Selection of "End" option causes the switching operation to end and then return to the step S40 in which the screen illustrated in (a) of FIG. 11 is displayed.

[Switching of Connection Type (LAN Cable Connection)]

Figure 14:
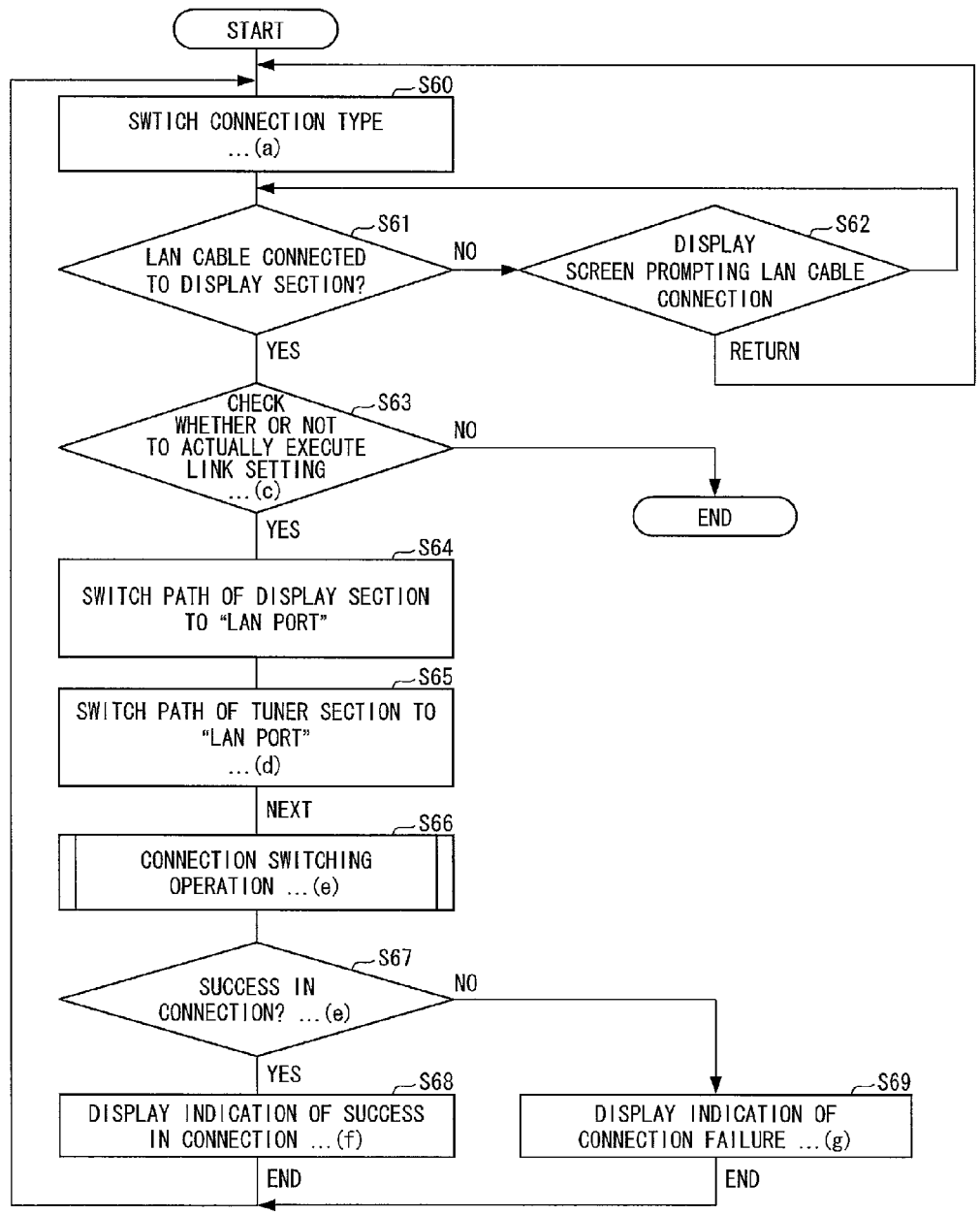
FIG. 14 is a flow chart illustrating respective operations of the tuner section and the display section for switching a connection type to a LAN cable connection.
Figure 15:
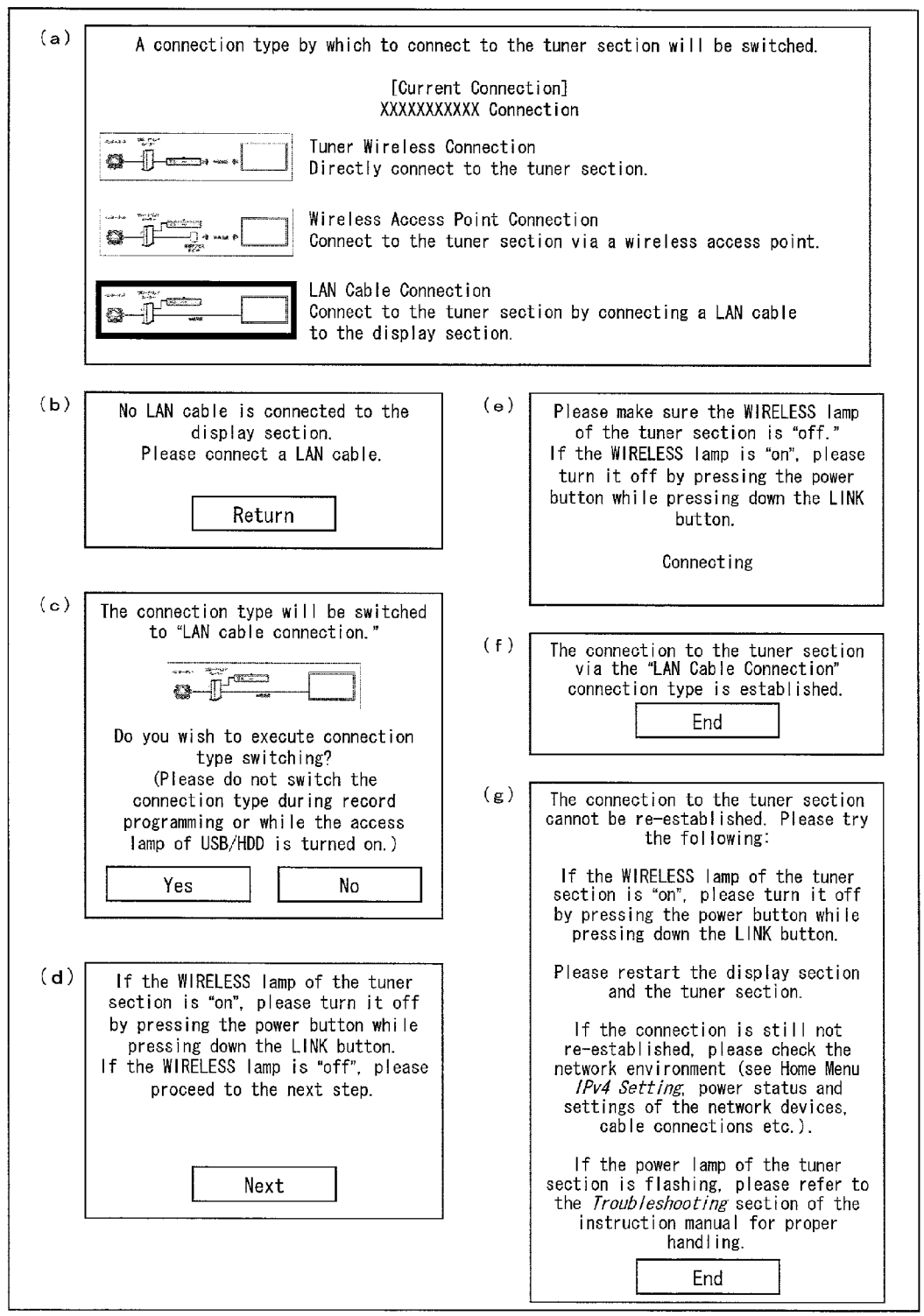
FIG. 15 is illustrating screens to be displayed during the operations illustrated in FIG. 14.

Next, how the tuner section 1 and the display section 2 operate when the connection type is switched to the wireless access point connection will be described below with reference to FIGS. 14 and 15. FIG. 14 is a flow chart illustrating how the tuner section 1 and the display section 2 operate when the connection type is to be switched to the LAN cable connection. FIG. 15 is a view illustrating screens to be displayed during the operation.

The operation to switch to the LAN cable connection is initiated by displaying a screen illustrated in (a) of FIG. 15 and causing a user to select a connection type (S60). The screen is similar to those illustrated in (a) of FIG. 9 and (a) of FIG. 11, and therefore will not be described. In this example, the LAN cable connection is to be selected.

In a case where the LAN cable connection is selected, it is examined whether or not a LAN cable is inserted into the display section 2 (S61). Specifically, the display-end path switching section 50 examines whether or not a LAN cable is connected to the wired communication IF 43.

In a case where it cannot be confirmed that a LAN cable is connected to the wired communication IF 43 (NO in S61), a screen illustrated in (b) of FIG. 15 is displayed so as to prompt the user to connect a LAN cable (S62). According to the example of (b) of FIG. 15, the screen shows (i) an indication that a LAN cable is not connected and (ii) a message prompting the user to connect a LAN cable. The screen also shows "Return" option to be selected for returning to the previous step. When "Return" option is selected, the switching operation returns to the step S61.

In a case where it has been confirmed that a LAN cable is connected (YES in S61), the display-end path switching section 50 causes a screen illustrated in (c) of FIG. 15 to be displayed so as to confirm that the user actually intends to switch to the LAN cable connection (S63). Note that the description of (c) of FIG. 15 will be omitted since (c) of FIG. 15 is similar to (b) of FIG. 9 and (b) of FIG. 11 except that the connection type is intended to be switched to the LAN cable connection.

In a case where "No" option is selected on the screen illustrated in (c) of FIG. 15, the switching operation ends without switching the connection type to the LAN cable connection. On the other hand, in a case where "Yes" option is selected, the display-end path switching section 50 causes a communication path to be switched to "LAN port" (S64). Specifically, the display-end path switching section 50 (i) deactivates communication via the wireless communication IF 42 and (ii) activates communication via the wireless communication IF 43. The display-end path switching section 50 also commands the display-end connection processing section 52 to initiate establishment of a wired connection to the tuner section 1.

Then, the display-end path switching section 50 causes a screen illustrated in (d) of FIG. 15 to be displayed so as to switch the communication path of the tuner section 1 to "LAN port" (S65). Note that (d) of FIG. 15 is similar to (b) of FIG. 12, and therefore will not be described.

When the communication path of the tuner section 1 is switched to "LAN port", the tuner-end path switching section 20 (i) activates communication via the wired communication IF 15 and (ii) commands the tuner-end connection processing section 21 to initiate establishment of a wired connection to the display section 2.

Thus the connection switching operation between the display section 2 and the tuner section 1 is executed (S66). During the connection switching operation, a screen illustrated in (e) of FIG. 15 is displayed. Note that (e) of FIG. 15 is similar to (c) of FIG. 12, and therefore will not be described. The connection switching operation will be described later in detail.

Next, the display-end path switching section 50 examines whether or not the connection has been successfully established as a result of the connection switching operation (S67). In a case where it is confirmed that the connection has been successfully established (YES in S67), the switching operation proceeds to a step S68 in which a screen indicative of the successful connection establishment is displayed. Such a screen can be a screen illustrated in (f) of FIG. 15. According to the example of (f) of FIG. 15, the screen shows an indication that the display section 2 is connected to the tuner section 1 via the LAN cable connection. The screen also shows "End" option to be selected for ending the connection type switching operation. When "End" option is selected, the connection type switching operation ends and then returns to the step S60 in which the screen illustrated in (a) of FIG. 15 is displayed.

On the other hand, in a case where it is confirmed that the connection establishment has failed (NO in S67), the connection type switching operation proceeds to a step S69 in which a screen indicative of the failure of the connection establishment is displayed. Such a screen can be a screen illustrated in (g) of FIG. 15. According to the example of (g) of FIG. 15, the screen shows (i) an indication that the connection establishment has failed and (ii) steps involved in solving the problem. The screen also shows "End" option to be selected for ending the connection type switching operation. When "End" option is selected, the connection type switching operation ends and then returns to the step S60 in which the screen illustrated in (a) of FIG. 15 is displayed.

[Details of Connection Switching Operation]

Figure 16:
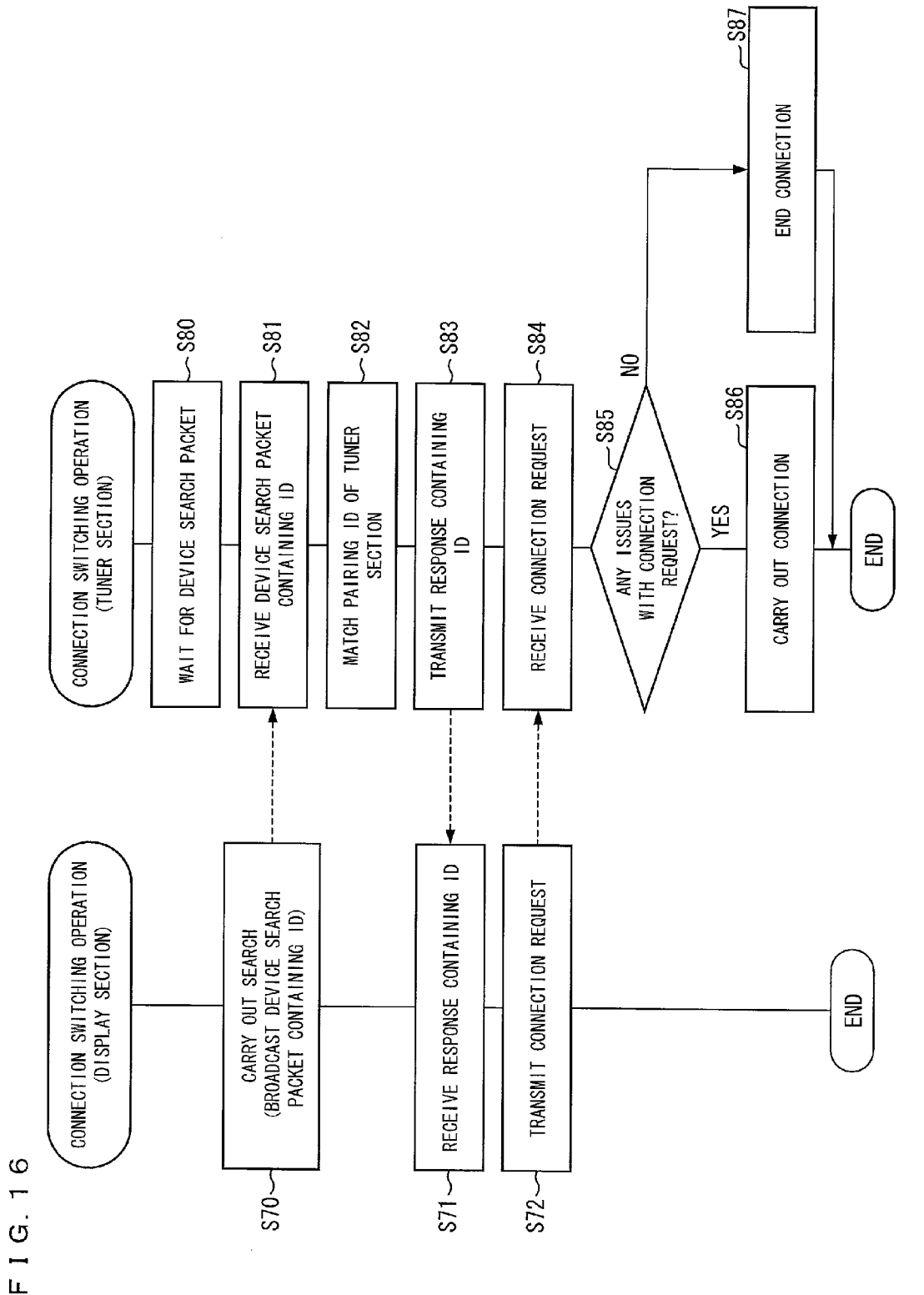
FIG. 16 is a flow chart illustrating respective connection switching operations of the tuner section and the display section.

Next, the connection switching operation executed in the step S66 illustrated in FIG. 16 will be described. FIG. 16 is a flow chart illustrating the connection switching operation executed between the tuner section 1 and the display section 2. Note that the operation of the display section 2 will be first described, and then the operation of the tuner section 1 will be described.

(Operations of Display Section 2)

First, the display-end connection processing section 52 executes searching. Specifically, the display-end connection processing section 52 transmits (broadcasts), via the wired communication IF 43, an ID-containing device search packet (response request) to a local device(s) which is connected to the router 3 (S70, device detection step).

An ID contained in the device search packet is based on (i) information obtained from the tuner section 1 while the display section 2 was pairing with the tuner section 1 for the tuner wireless connection and (ii) information on the display section 2. Specifically, use is to be made of an ID (pairing ID of the tuner section 1) which is generated by encoding a combination of (I) a MAC address of the tuner section 1 (partner device specifying information) which was received during the pairing and (II) a MAC address of the display section 2.

Note that the ID transmitted along with the device search packet is a piece of information obtained while the display section 2 establishes a wireless connection with the display section 2. The ID need only be a piece of information by which the tuner section 1 can determine, when receiving the device search packet containing the ID, that the device search packet is directed to the tuner section 1. For example, the MAC address, an SSID, or the like of the tuner section 1 can be transmitted as the ID. Note, however, that use of an ID obtained by encoding (or encrypting) a MAC address or an SSID is preferable, for security reason, to use of the MAC address or the SSID as it is.

Then, the display-end connection processing section 52 receives an ID-containing response to the device search packet that was transmitted (S71). Since the device search packet contains the pairing ID, the response is transmitted to the display-end connection processing section 52 from, of all the devices that received the device search packet, the tuner section 1 which recognizes the pairing ID.

Specifically, the response received by the display-end connection processing section 52 in the step S71 is transmitted from the tuner section 1, and the ID by which the response is provided is provided by the tuner section 1. This ID is based on a piece of information which the tuner section 1 obtains from the display section 2 when pairing with the display section 2 for the tuner wireless connection. Specifically, the ID (pairing ID of the display section 2) is generated by encoding the MAC address of the display section 2 which was received during the pairing.

Note that the ID transmitted along with the response is a piece of information obtained while the tuner section 1 is wirelessly connected to the display section 2. The ID need only be a piece of information by which the display section 2 can determine, when receiving the response that contains the ID, that the response was transmitted from the tuner section 1. For example, the MAC address, an SSID, or the like of the display section 2 can be transmitted as the ID. Note, however, that use of an ID obtained by encoding (or encrypting) a MAC address or an SSID is preferable, for security reason, to use of the MAC address or the SSID as it is.

The display-end connection processing section 52 (i) confirms, based on the ID, that the response was transmitted from the tuner section 1 and then (ii) obtains, by analyzing a header or the like of the response, information (IP address or the like) necessary for communicating with the tuner section 1. Then, the display-end connection processing section 52 (I) causes the information to be stored in the communication setting storage section 60 of the display storage section 41 and (II) transmits, to the tuner section 1 by use of the information, a connection request requesting establishment of communication via a LAN cable (S72, communication establishment step).

In a case where the connection request is granted, a communication (LAN cable connection) between the display section 2 and the tuner section 1 via a LAN cable is established. This allows the display section 2 to (i) receive a digital terrestrial broadcast image from the tuner section 1 via the LAN cable and then (ii) display the digital terrestrial broadcast image.

(Operation of Tuner Section 1)

The tuner-end connection processing section 21 waits to receive the device search packet (S80). When the tuner-end connection processing section 21 receives the device search packet (S81), the tuner-end connection processing section 21 examines whether or not there is a match between (i) the ID contained in the device search packet and (ii) a pairing ID generated by encoding a combination of the MAC address of the tuner section 1 and the MAC address of the display section 2. Alternatively, it is also possible to generate data by encoding the ID contained in the device search packet and then to examine whether or not the data contains the MAC address of the tuner section 1. Regardless of which alternative to be selected, it is necessary that the tuner section 1 and the display section 2 both employ an identical encoding/decoding method.

Since an ID transmitted from the display section 2 is thus the pairing ID of the tuner section 1, the ID contained in the device search packet and the pairing ID match each other if the device search packet received was transmitted from the display section 2 (S82).

In a case where the match is confirmed, the tuner-end connection processing section 21 (i) transmits, to the display section 2, a response to the device search packet (S83) and then (ii) receives a connection request from the display section 2 which received the response (S84).

Then, the tuner-end connection processing section 21 examines, by analyzing the connection request, whether or not the connection request contains any issues (S85). In a case where the connection request contains no issues (YES in S85), the tuner-end connection processing section 21 (i) obtains, from a header or the like of the connection request, information (IP address or the like) necessary for communicating with the display section 2 and then (ii) causes the information to be stored in the communication setting storage section 30 of the tuner storage section 11. This causes the communication (LAN cable connection) to be established between the display section 2 and the tuner section 1 via the LAN cable (S86), and thus the connection switching operation ends. On the other hand, in a case where it is found that the connection request contains any issues (NO in S85), the connection between the display section 2 and the tuner section 1 is terminated (S87), and thus the connection switching operation ends.

[Example of Connection Switching Operation]

Figure 17:
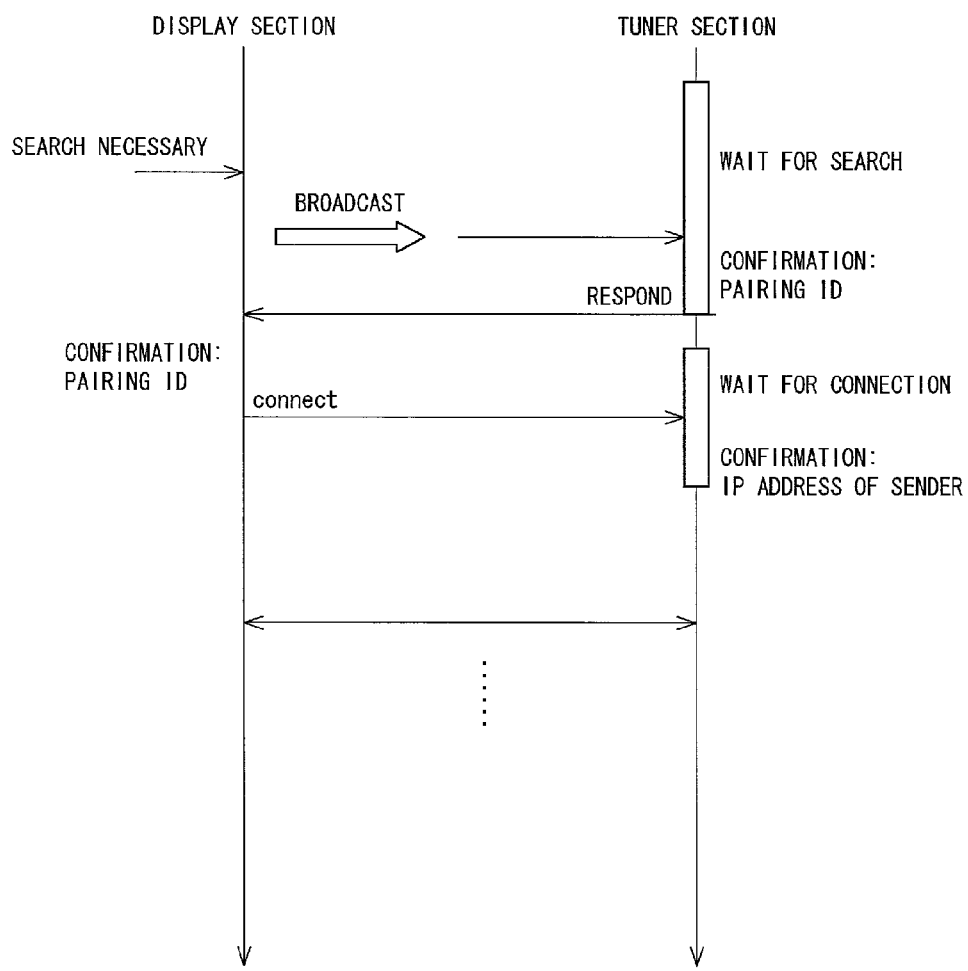
FIG. 17 is a timing chart illustrating the connection switching operations.

Next, the connection switching operation will be further described below with reference to FIG. 17. FIG. 17 is a timing chart illustrating the connection switching operation.

In the connection switching operation, the display section 2 determines that a search needs to be carried out, and then transmits (broadcasts) a device search packet to a device(s) (including the tuner section 1 that is waiting for the search to be carried out) which is/are connected to a LAN. The device search packet contains a pairing ID generated based on the MAC address of the tuner section 1.

After receiving the device search packet, the tuner section 1 determines, based on the pairing ID, that the device search packet is directed to the tuner section 1, and then transmits a response to the display section 2. The response contains a pairing ID generated based on the MAC address of the display section 2.

After receiving the response, the display section 2 confirms, based on the pairing ID, that the response was transmitted from the tuner section 1, and then transmits a connection request (connect) to the tuner section 1 which is waiting to receive the connection request. After receiving the connection request, the tuner section 1 confirms, by analyzing the connection request, an IP address of the device from which the connection request was transmitted.

[Key Points in Connection Switching Operation]

Figure 18:
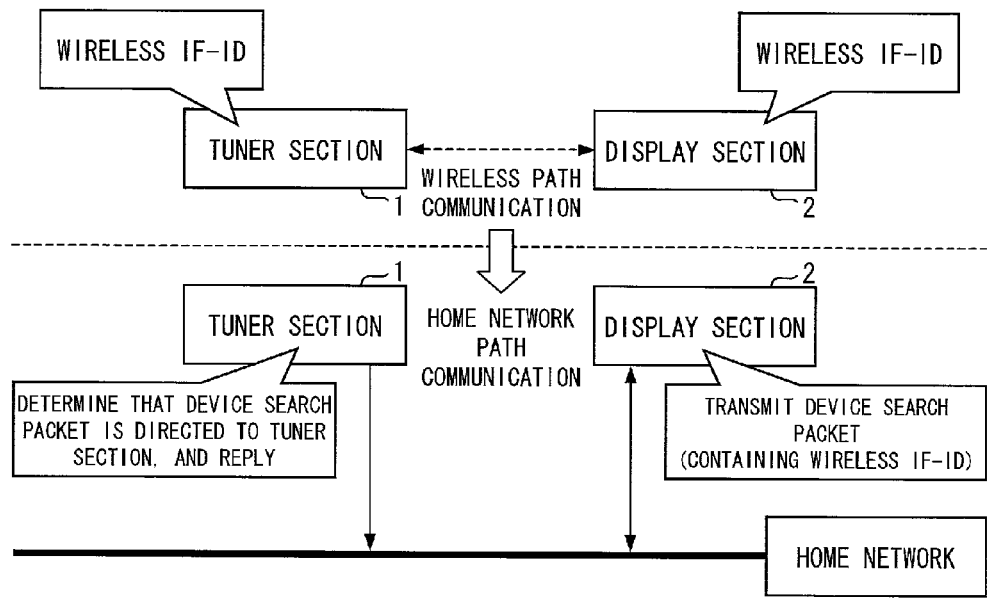
FIG. 18 is a view for describing key points of the connection switching operations.

Next, key points in the connection switching operation will be described below with reference to FIG. 18. FIG. 18 is a view illustrating the key points in the connection switching operation.

As illustrated in FIG. 18, the tuner section 1 and the display section 2 obtain, via a wireless path communication, each other's wireless IF-IDs (specifically, pairing IDs). When the communication is switched to communication via a home network path (LAN cable connection), the display section 2 transmits (broadcasts), to a home network, a device search packet containing the wireless IF-ID of the tuner section 1.

The wireless IF-ID transmitted from the display section 2 is a pairing ID based on the MAC address of the tuner section 1. This allows the tuner section 1 to determine that the device search packet is directed to the tuner section 1, and therefore to transmit a response packet in response to the device search packet.

According to the connection switching operation of the image display system 100, a connection destination is thus determined by use of information obtained via the wireless path communication. This makes it easy to find the tuner section 1 out of all devices connected to the LAN, and therefore makes it extremely easy to switch between the connections.

In a case where communication via a connection type before execution of the switching is unavailable (in a case where a communication failure occurs or a user is located outside a communication range etc.), it is not possible to specify in advance a connection destination to switch to and thereafter switch to the connection destination. Therefore, in such a case, the above system for a connection switching operation is particularly effective.

[Automatic Switching of Connection Type]

Although the above examples illustrated the operations to manually switch a connection type (see (b) of FIG. 3), it is also possible to automatically switch a connection type (see (a) of FIG. 3). In a case where automatic switching is employed, instead of a UI screen being displayed to prompt a user operation with respect to the tuner section 1, the tuner commanding section 51 transmits a command to the tuner section 1 so as to cause the tuner section 1 to execute the connection type switching operation.

Note that, other than the three connection types described above, an alternative use of the image display system 100 is possible, such as viewing a digital broadcast content via the wireless communication IF 14 of the tuner section 1 while using the Internet via the wired communication IF 15 (another use form 1).

Specifically, according to another use form 1, objects for a user to use are switched by switching between communication IFs such as activating the wireless communication IF 14 during viewing of a digital broadcast content while activating the wired communication IF 15 during the use of the Internet.

In addition, there is also a possibility that the image display system 100 is used in an environment where a wired connection to an antenna and a connection to a local network cannot be made in a shared space. In such a case, the following form of use is to be employed: While a digital broadcast content is viewed, (i) the wireless communication IF 14 of the tuner section 1 is activated and (ii) the display section 2 is located in a space where the tuner section 1 is located (space where a wired connection to the antenna is available). In so doing, the tuner section 1 is not connected to the router 3, and the wired communication IF 15 is not connected to a LAN cable. On the other hand, while the Internet is used, (I) the display section 2 is located in a space where the router 3 is located (space where a connection to the local network is available) and (II) the router 3 and the tuner section 1 are connected via a wired connection. Then, the wired communication IF 15 of the tuner section 1 is activated for the Internet to be used (another use form 2).

According to the use form 2, a LAN cable is not connected to the wired communication IF 15 of the tuner section 1 while a digital broadcast content is viewed. Therefore, if, while the use form 2 is employed, a switch is made from the viewing of a digital broadcast content to the use of the Internet by activating the wired communication IF 15 as though such a switch is made while the use form 1 is employed, then it causes such a problem that communication between the tuner section 1 and the display section 2 is cut off. This is because, in a case where the switch is made so as to use the wired communication IF 15 which is not connected the LAN cable, neither communication via the wired communication IF 15 nor communication via the wireless communication IF 14 is available. If, in particular, switching of a connection type is executed out only by use of automatic switching, then it poses a bigger problem since it is not possible to restore a connection by a user operation on the tuner section 1.

As a solution to the problem, the following process can be considered: In a case where a connection type switching operation is to be executed by automatic switching, it is to be examined before the switching whether or not communication to the tuner section 1 via the wired communication IF 15 is available, and, if not, the connection type switching operation is to be terminated.

Figure 19:
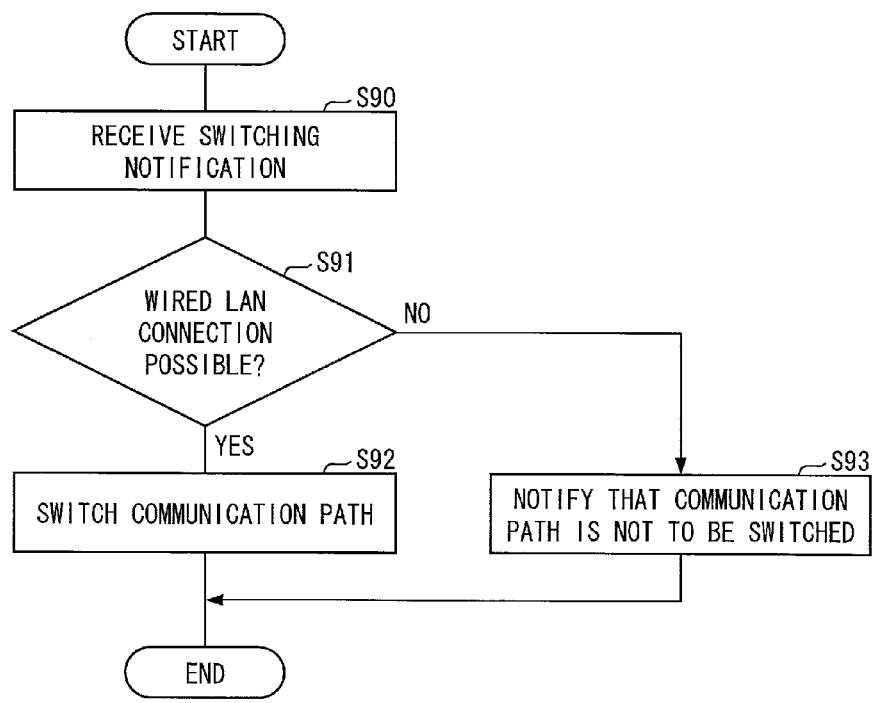
FIG. 19 is a flow chart illustrating an operation of the tuner section which has received, from the display section, a command to switch a connection type.

Such a process will be described below with reference to FIG. 19. FIG. 19 is a flow chart illustrating an operation of the tuner section 1 that has received, from the display section 2, a command to execute a connection type switching operation.

When the tuner-end path switching section 20 receives, from the tuner commanding section 51 of the display section 2, a connection type switching command (S90), the tuner-end path switching section 20 determines whether or not it is possible to connect to the display section 2 via a wired LAN connection (S91). That is, the tuner-end path switching section 20 serves as communication availability determining means.

Note that the connection type switching command is a command to activate the wired communication IF 15. Note also that whether or not a connection via a wired LAN connection is available can be determined by, for example, whether or not a LAN cable is connected to the wired communication IF 15. Furthermore, such determination can even be based on confirmation that there is no problem with the wired LAN connection between the tuner-end path switching section 20 and the display section 2.

In a case where it is determined that the wired LAN connection is available (YES in S90), the tuner-end path switching section 20 makes a switch to a communication path via the wired communication IF 15 (S92). That is, the tuner-end path switching section 20 serves also as partner device-end path switching means. The operation thus ends.

On the other hand, in a case where it is determined that the wired LAN connection is unavailable (NO in S90), the tuner-end path switching section 20 ends the communication path switching operation, and notifies the display section 2 accordingly. The operation thus ends.

[Switching of Connection Type by System Judgment]

The manual and automatic switching of a connection type in the above examples are each executed upon a user operation. Alternatively, switching of a connection type can be based on the judgment of the image display system 100 without a user operation being involved.

Figure 20:
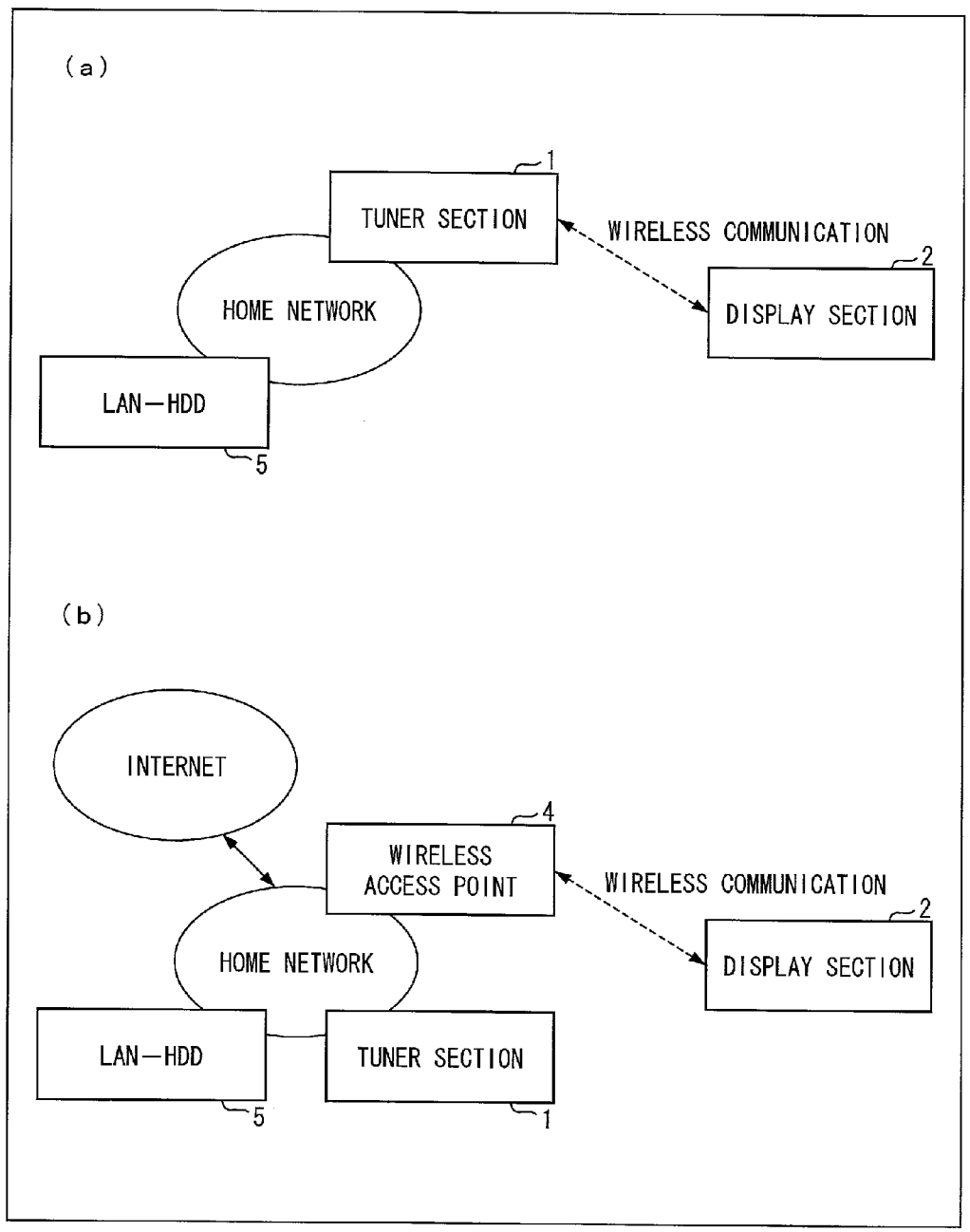
FIG. 20 is a set of views (a) and (b) for describing a connection type switching operation based on the judgment of the image display system, (a) of FIG. 20 illustrating a pre-switching state and (b) of FIG. 20 illustrating a post-switching state.

Such system-based switching will be described below with referenced to FIG. 20. FIG. 20 is a set of views illustrating the switching of a connection type based on the judgment of the image display system 100, (a) and (b) of FIG. 20 illustrating a pre-switching state and a post-switching state, respectively, of the image display system 100.

While the image display system 100 is in the state shown in (a) of FIG. 20, (i) the display section 2 is wirelessly connected to the tuner section 1 and (ii) the tuner section 1 transmits, to the display section 2, an image signal based on a digital broadcast content as well as records the digital broadcast content in a LAN-HDD within a home network.

In this state, the tuner control section 10 of the tuner section 1 simultaneously executes (i) an operation to generate the image signal based on broadcast waves and then to transmits the image signal and (ii) an operation to record the digital broadcast content based on the image signal. Therefore, the tuner control section 10 bears a significantly heavy workload. In addition, since the tuner section 1 produces outputs to the two locations (the LAN-HDD and the display section 2), a heavy workload is also placed on an output IF.

Therefore, in a case where a workload becomes thus heavy, the tuner-end path switching section 20 notifies the display section 2 accordingly. Note that there is no particular limitation on the content of the notification to the display section 2, provided that the content can be a basis for a judgment of the display section 2 as to whether or not a connection type needs to be switched. For example, in a case where the tuner control section 10 is implemented by a CPU, the content can provide information on CPU usage or information indicating that a workload has exceeded a predetermined threshold.

Then, the display-end path switching section 50, which thus received the notification, switches the connection type to another. That is, the display-end path switching section 50 serves as path switching means. Note that in a case where the content of the notification concerns information on the degree of the workload such as information on the CPU usage, the judgment of the display section 2 is made by an operation such as comparison of the degree of the workload with a predetermined threshold. Alternatively, it is also possible to display a UI screen that asks whether or not to switch the connection type so that a user determines whether or not to switch the connection type.

A connection type, to which the switch is to be made, can be a wireless access point connection as illustrated in (b) of FIG. 20. In such a case, the tuner control section 10 no longer needs to transmit an image signal to the display section 2, and therefore the tuner section 1 need only produce an output to the LAN-HDD. This causes a reduction in the workload of the tuner section 1. Although the user is prevented from viewing a digital broadcast content transmitted from the tuner section 1, the user can still view contents available on the Internet via the wireless access point connection.

Note that, in a case where the above switching operation is executed, the display section 2 can obtain the digital broadcast content recorded in the LAN-HDD. This allows the user to continue viewing the digital broadcast content while reducing the workload of the tuner section 1.

(b) of FIG. 19 thus shows the example in which the switch is made to the wireless access point connection. In a case where a LAN cable connection is available, however, a switch can be made to the LAN cable connection.

[Modification]

Although, in the above example, a communication setting for a wired connection is facilitated with the use of information which is obtained when a wireless connection is established, it is likewise possible to facilitate a communication setting for a wireless connection with the use of information which is obtained when a wired connection is established. For example, it is possible to (i) exchange, when a wired connection is established, information such as SSIDs, PIN codes, and MAC addresses for wireless communication and (ii), when a switch is made to a wireless connection, use the information to set communication.

In a case where use is made of a system in which there are a plurality of wireless communication paths, it is possible to facilitate a communication setting for a wireless connection via any given path by use of information obtained when a wireless connection via another path is established. This principle also applies to a system in which there are a plurality of wired communication paths.

In the above example, a communication setting, which is executed when a switch is made to a LAN cable connection, is facilitated by use of information obtained when a wireless connection is established. Alternatively, it is also possible to facilitate, when a switch is made to a wireless access point connection, a connection setting by use of information obtained when a wireless connection is established. This is because the tuner section 1, which is connected to a LAN, needs to be detected even when the switch is to be made to the wireless access point connection (see S47 through S49 of FIG. 10).

Furthermore, in the above example, the tuner section 1 is detected by transmission (broadcasting) of a device search packet. Alternatively, it is also possible to initiate establishment of communication without transmission (broadcasting) of a device search packet. For example, it is possible to employ a method in which RARP (Reverse Address Resolution Protocol) is used or a method in which the initiation of communication is continuously attempted until a response is made.

[IPv4 Setting]

Next, "IPv4 setting" illustrated in FIG. 5 will be described below with reference to FIG. 21. FIG. 21 is a view illustrating screens displayed during IPv4 setting in which network parameters such as IP addresses of the display section 2 and the tuner section 1 are set.

When the remote control signal receiving section 45 receives a user operation to select "IPv4 Setting" item, a screen illustrated in (a) of FIG. 21 is displayed. According to the example of (a) of FIG. 21, the screen shows (i) an indication that a LAN will be set (IPv4), (ii) a current setting, and (iii) cautions to pay attention to when the setting is to be changed. The screen also shows three options to be selected, "Change", "Do Not Change", and "Initialize." Note that a part of the view enclosed in a dotted line is to be displayed only when (I) the display section 2 is connected to the tuner section 1 and (II) a connection type is a wireless access point connection or a LAN cable connection.

In a case where "Change" option is selected, a screen illustrated in (b) of FIG. 21 is displayed. According to the example of (b) of FIG. 21, the screen shows (i) a message inquiring whether or not an IP address is to be obtained automatically and (ii) "Yes" and "No" options to be selected for indicating whether or not the IP address is to be obtained automatically. The screen also allows a user to input an IP address of the display section 2, an IP address of the tuner section 1, a netmask, and a gateway. In addition, the screen shows "Next" option for proceeding to a next step. Note that a part of the view enclosed in a dotted line is to be displayed only when (I) the display section 2 is connected to the tuner section 1 and (II) a connection type is a wireless access point connection or a LAN cable connection.

When "Next" option is selected, it is examined whether or not an inputted setting is correct. In a case where it is determined that the inputted setting is incorrect, a screen illustrated in (c) of FIG. 21 is displayed. According to the example of (c) of FIG. 21, the screen shows (i) a message indicating that the inputted setting is incorrect and that a setting needs to be inputted again and (ii) "Return" item for returning to the screen illustrated in (b) of FIG. 21.

In a case where it is determined that the inputted setting is correct, a screen illustrated in (d) of FIG. 21 is displayed. According to the example of (d) of FIG. 21, the screen shows (i) a message inquiring whether or not an IP address of a DNS is to be obtained automatically and (ii) "Yes" and "No" options to be selected for indicating whether or not the IP address is to be obtained automatically. The screen also allows the user to input a primary IP address and a secondary IP address. In addition, the screen shows "Next" item for proceeding to a next step.

When "Next" item is selected, a screen illustrated in (e) of FIG. 21 is displayed. According to the example of (e) of FIG. 21, the screen shows a list of items which were set on the above setting screen. The screen also shows "End" option for completing (ending) the setting operation and "Perform Test" option for carrying out a connection test with the use of the inputted setting.

[Screen Display Setting]

Next, a display setting of the screen of the display section 2 will be described below with reference to FIG. 22. FIG. 22 is a view illustrating arrangements of UI screens for screen display settings. As illustrated in FIG. 22, "Screen Display Setting" becomes selectable when a transition is made from "Home Menu" to "Function Switching." Then, a further transition can be made from the "Screen Display Setting" UI screen to "Display Wireless Reception Strength" or "Display Wireless Error Message" UI screen.

The "Display Wireless Reception Strength" UI screen allows a user to select "Yes" or "No" for displaying an icon indicative of strength of wireless reception. By default, the icon can be set to be displayed. Note that while a connection type (LAN cable connection) that does not carry out wireless communication is employed, the icon indicative of the strength of wireless reception is not to be displayed regardless of the setting of the UI screen.

The "Display Wireless Error Message" UI screen allows the user to select "Yes" or "No" for displaying an error message and an alert message in regard to a wireless connection. By default, such messages can be set to be displayed. The error message and the alert message will be described below in detail.

[Message Display Regarding Physical Disconnection]

In a case where the display section 2 is not connected to a wireless access point while a wireless access point connection is employed as a connection type, neither viewing of a digital broadcast content nor use of the Internet is possible. Likewise, neither viewing of a digital broadcast content nor use of the Internet is possible in a case where a LAN cable is not connected to the display section 2 while a LAN cable connection is employed as a connection type. In such cases, an alert message continues to be displayed until a connection is restored.

Figure 23:
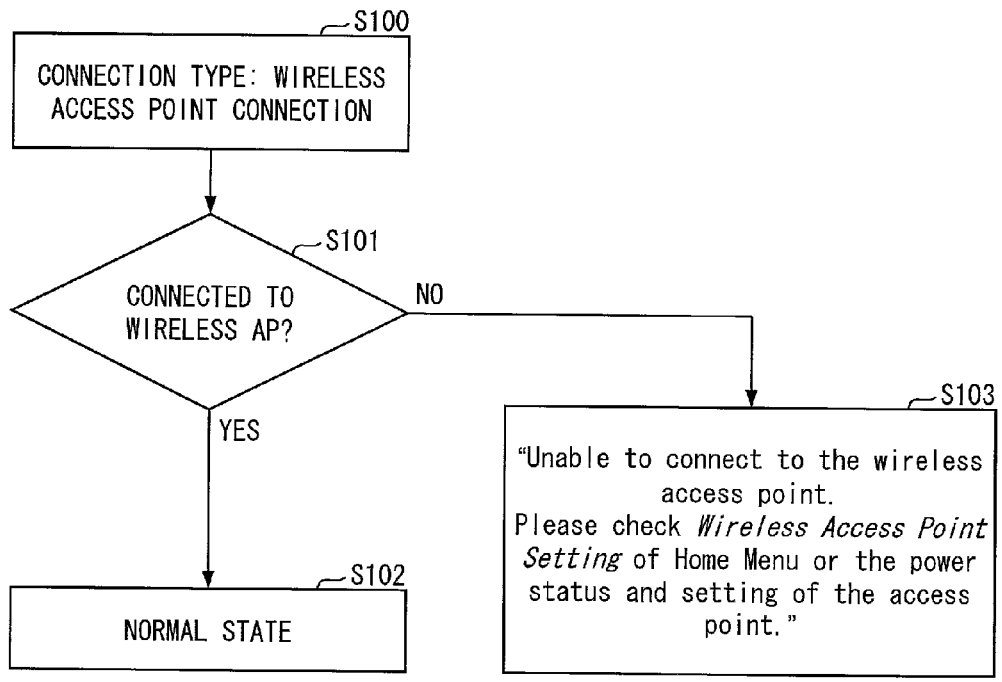
FIG. 23 is a flow chart illustrating how an operation is executed for an alert message indicative of physical disconnection while a wireless access point connection is employed.
Figure 24:
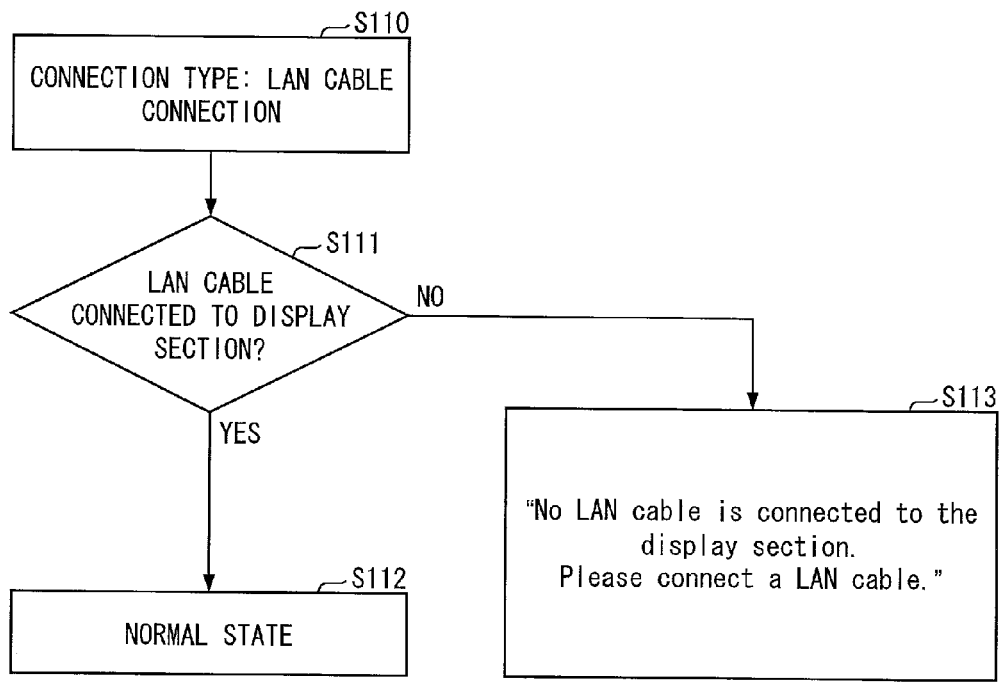
FIG. 24 is a flow chart illustrating how an operation is executed for an alert message indicative of physical disconnection while a LAN cable connection is employed.

Displaying of an alert message will be described below with reference to FIGS. 23 and 24. FIG. 23 is a flow chart illustrating how an operation is executed for an alert message indicative of physical disconnection while a wireless access point connection is employed. FIG. 24 is a flow chart illustrating how an operation is executed for an alert message indicative of physical disconnection while a LAN cable connection is employed.

As illustrated in FIG. 23, in a case where the connection type is the wireless access point connection (S100), the display control section 40 examines whether or not the display section 2 is connected to the wireless access point 4 (S101).

In a case where the connection is confirmed (YES in S101), it is determined that the connection is in a normal state (S102). In this case, no alert message is displayed. On the other hand, in a case where it is confirmed that the display section 2 is not connected to the wireless access point 4 (NO in S101), an alert message illustrated in FIG. 23 is displayed at, for example, a lower center part of the screen (S103).

As illustrated in FIG. 24, in a case where the connection type is the LAN cable connection (S110), the display control section 40 examines whether or not a LAN cable is connected to the display section 2 (S111).

In a case where the connection is confirmed (YES in S111), it is determined that the connection is in a normal state (S112). In this case, no alert message is displayed. On the other hand, in a case where it is confirmed that no LAN cable is connected to the display section 2 (NO in S111), an alert message illustrated in FIG. 24 is displayed at, for example, a lower center part of the screen (S113).

[Message Display Regarding Disconnection from Tuner Section 1]

Figure 25:
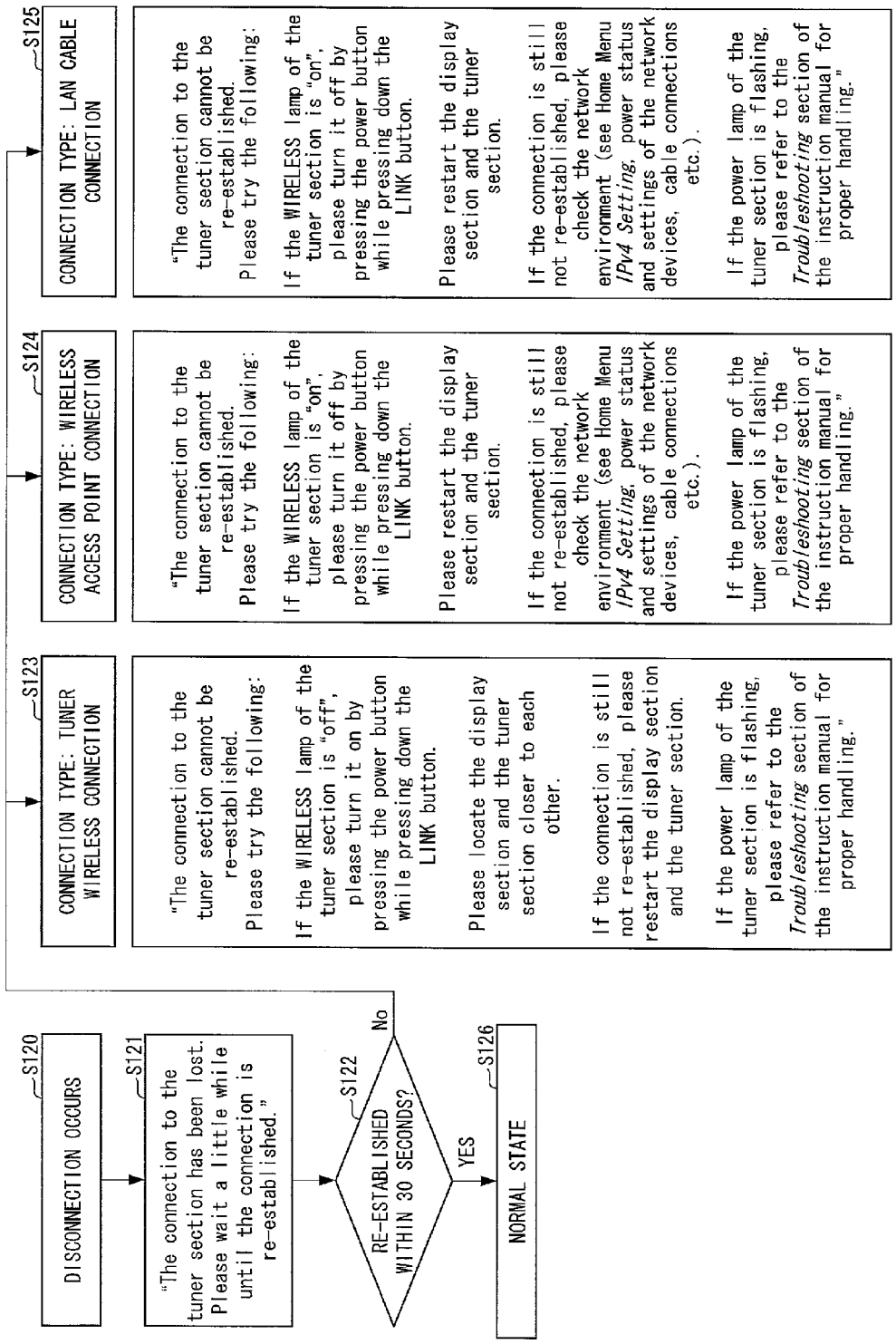
FIG. 25 is a flow chart illustrating an operation to be executed for displaying a message regarding the disconnection from the tuner section 1.

A message is to be displayed in a case where disconnection from the tuner section 1 is confirmed although it is not such physical disconnection as that described above. This will be described below with reference to FIG. 25. FIG. 25 is a flow chart illustrating an operation to be executed for displaying a message regarding the disconnection from the tuner section 1.

In a case an occurrence of the disconnection is detected (S120), the display control section 40 displays a message (which is illustrated in FIG. 25) at, for example, a lower center part of the screen so as to notify a user of the occurrence of the disconnection (S121).

In addition, when the disconnection is detected, the display control section 40 (i) initiates measuring duration of the disconnection and (ii) examines whether or not the connection is restored within 30 seconds from the detection of the disconnection. Note that the length of "30 seconds" is merely an example, and such length is not limited to 30 seconds. In a case where it is confirmed the connection is restored within 30 seconds from the detection of the disconnection (YES in S122), (I) it is determined that the connection is back in a normal state (S126) and (II) the notification of the occurrence of the disconnection ends.

On the other hand, in a case where it is not confirmed that the connection is restored within 30 seconds from the detection of the disconnection (NO in S122), the display control section 40 displays, at a lower center part of the screen for example, a message (illustrated in FIG. 25) which corresponds to a connection type being employed (S123 through S125). Specifically, in a case where a tuner wireless connection, a wireless access point connection, or a LAN cable connection is employed, the display control section 40 displays a message illustrated in a lower part of the step S123, S124, or S125, respectively, of FIG. 25.

Note that the phrase "Please check the network environment" in the messages are intended to prompt the user to confirm (i) settings such as IP addresses, (ii) the connection of the LAN cable, and (iii) a power status of each device.

[Message Display Regarding Interference]

Figure 26:
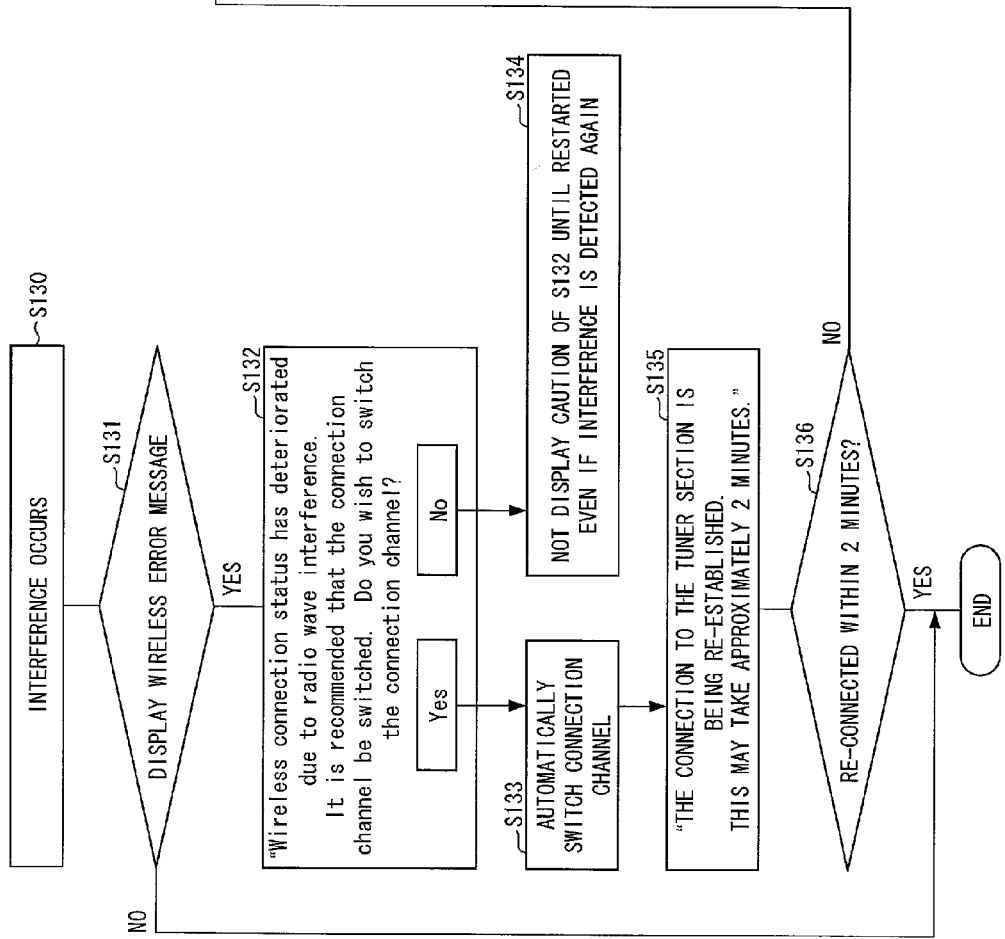
FIG. 26 is a flow chart illustrating how an operation is executed for displaying a message regarding the occurrence of interference.

A message is to be also displayed in a case where interference in wireless communication occurs. This will be described below with reference to FIG. 26. FIG. 26 is a flow chart illustrating how an operation is executed for displaying a message regarding the occurrence of the interference.

When the interference in wireless communication is detected (S130), the display control section 40 determines whether or not a wireless error message is to be displayed (S131). The operation ends without displaying the wireless error message in a case where (i) the wireless error message is set not to be displayed or (ii) it is determined that the wireless error message does not need to be displayed for a reason although the wireless error message is set to be displayed.

On the other hand, in a case where it is determined that the wireless error message is to be displayed in the step S131, a message (illustrated in FIG. 26) intended for a case of the wireless communication interference is displayed (S132). In a case where "No" option is selected on the message, the operation proceeds to a step S134 from which it is determined that the caution (message in S132) will not be displayed until a power supply restarted even though the interference is detected before the restart. On the other hand, in a case where "Yes" option is selected, the operation proceeds to a step S133 in which a connection channel is automatically switched.

In the automatic switching of the connection channel, (i) the display-end connection processing section 52 carries out re-connection with the tuner section 1 via another channel and (ii) the display control section 40 displays a message illustrated in FIG. 26 (S135).

Then, the display control section 40 examines whether or not the re-connection was successfully carried out within 2 minutes (S136). In a case where the re-connection was successfully carried out within 2 minutes (YES in S136), the operation ends. On the other hand, in a case where the re-connection is not successfully carried out after 2 minutes elapses (NO in S136), a message illustrated in FIG. 26 is displayed (S137).

[Message Display Regarding Decrease in Throughput]

Figure 27:
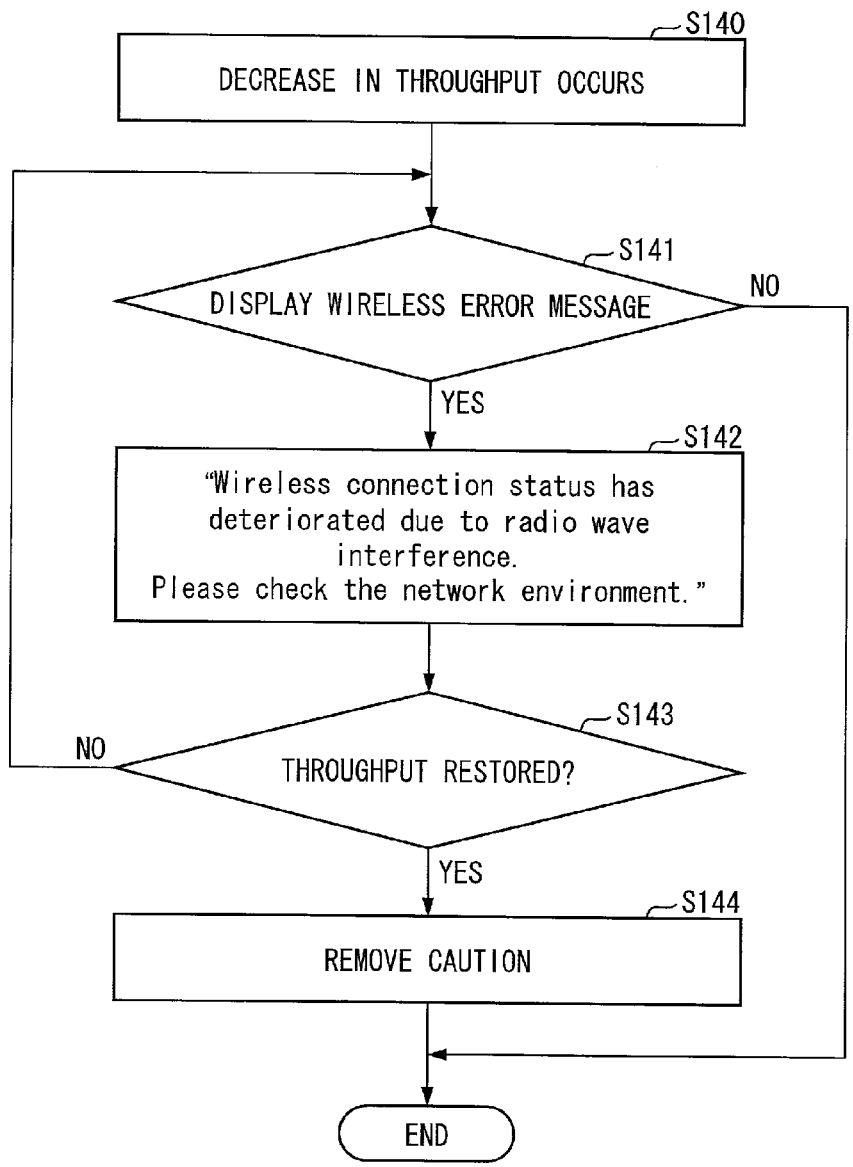
FIG. 27 is a flow chart illustrating how an operation is executed for displaying a message regarding a decrease in a throughput.

A message is to be also displayed in a case where throughput of wireless communication is decreased. This will be described below with reference to FIG. 27. FIG. 27 is a flow chart illustrating how an operation is executed for displaying a message regarding a decrease in the throughput.

In a case where a decrease in the throughput is detected (S140), the display control section 40 determines whether or not a wireless error message is to be displayed (S141). The operation ends without displaying the wireless error message in a case where (i) the wireless error message is set not to be displayed or (ii) it is determined that the wireless error message does not need to be displayed for a reason although the wireless error message is set to be displayed.

On the other hand, in a case where it is determined that the wireless error message is to be displayed in the step S141, a message (illustrated in FIG. 27) intended for a case of a decrease in a wireless communication throughput is displayed (S142). A given length of time after the message is displayed, it is examined whether or not the throughput is restored (S143).

In a case where the throughput is restored (YES in S143), the caution (message in S143) is removed, and thus the operation ends. On the other hand, the throughput is not restored (NO in S143), the operation returns to the step S141, and the caution (message) continues to be displayed.

[Message Display Regarding Decrease in Wireless Signal Reception Strength]

Figure 28:
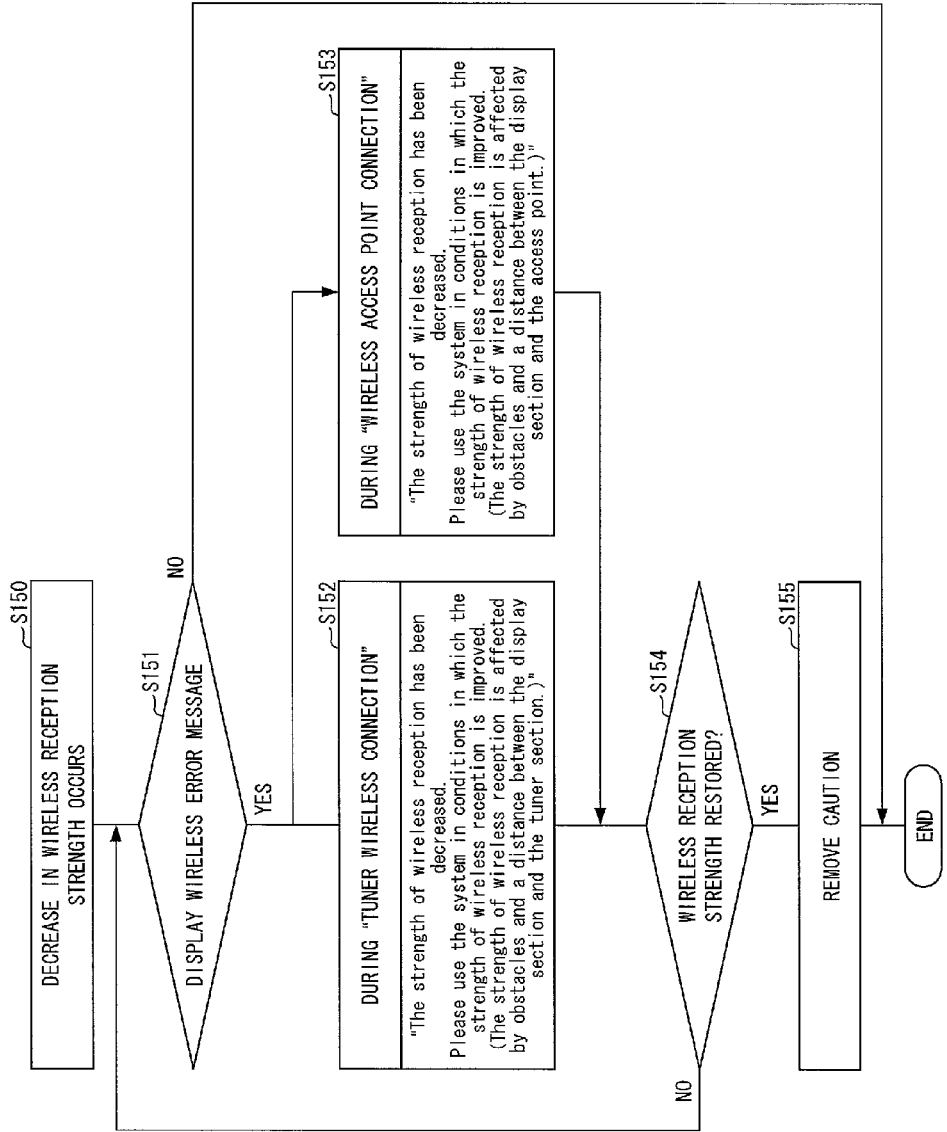
FIG. 28 is a flow chart illustrating how an operation is executed for displaying a message regarding a decrease in the strength of reception in wireless communication.

A message is to be also displayed in a case where strength of reception in wireless communication is decreased. This will be described below with reference to FIG. 28. FIG. 28 is a flow chart illustrating how an operation is executed for displaying a message regarding a decrease in the strength of reception in wireless communication.

In a case where a decrease in the strength of reception in wireless communication is detected (S150), the display control section 40 determines whether or not a wireless error message is to be displayed (S151). The operation ends without displaying the wireless error message in a case where (i) the wireless error message is set not to be displayed or (ii) it is determined that the wireless error message does not need to be displayed for a reason although the wireless error message is set to be displayed.

In a case where (i) it is determined that the wireless error message is to be displayed and (ii) a tuner wireless connection is being employed as connection type, the operation proceeds to a step S152 in which a message illustrated in the step S152 of FIG. 28 is displayed. On the other hand, In a case where (I) it is determined that the wireless error message is to be displayed and (II) a wireless access point connection is being employed as a connection type, the operation proceeds to a step S153 in which a message illustrated in the step S153 of FIG. 28 is displayed.

A given length of time after such a message is displayed, it is examined whether or not the strength of reception in the wireless communication is restored (S154). In a case where the strength is restored (YES in S154), the caution (message in S152 or S153) is removed, and thus the operation ends. On the other hand, in a case where the strength is not restored (NO in S154), the operation returns to the step S151.

[Message Display Regarding Detection of Radar Waves]

Figure 29:
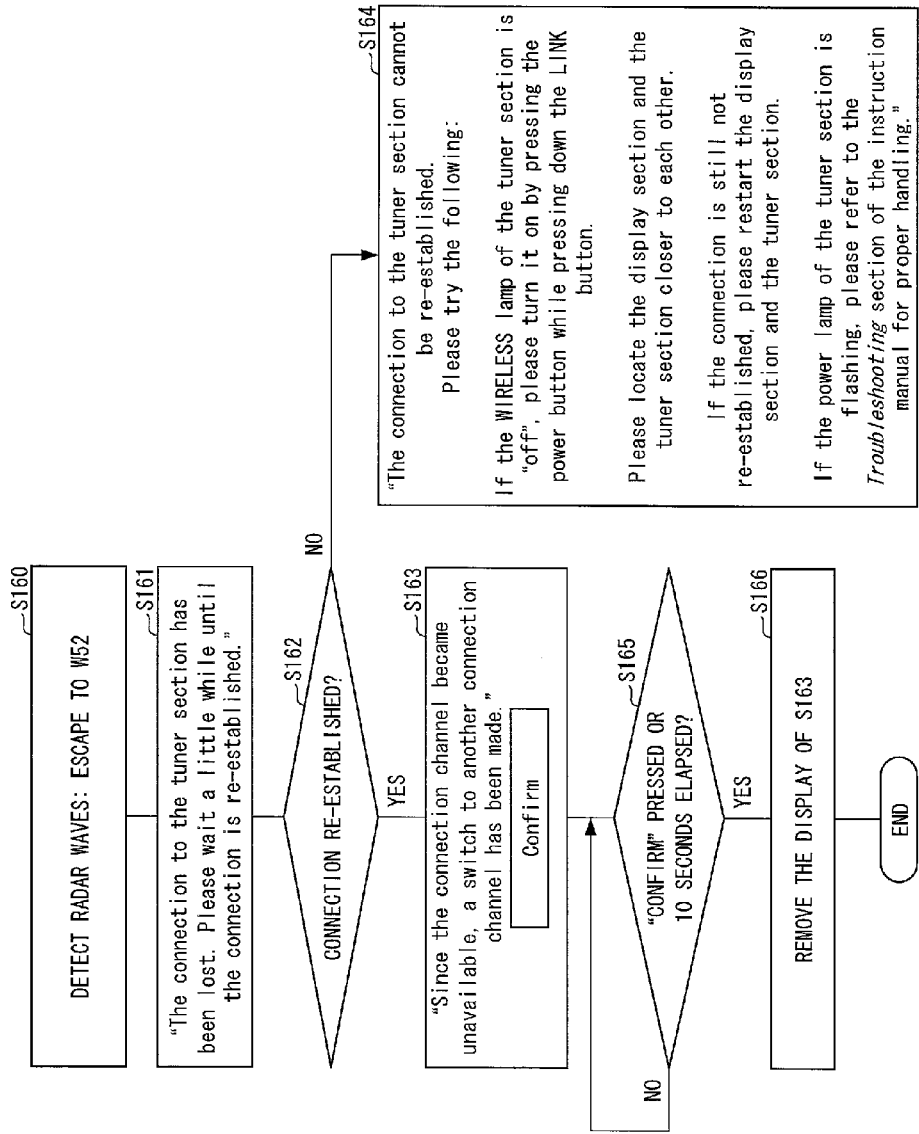
FIG. 29 is a flow chart illustrating how an operation is executed for displaying a message regarding detection of radar waves.

A message is to be also displayed in a case where radar waves are detected. This will be described below with reference to FIG. 29. FIG. 29 is a flow chart illustrating how an operation is executed for displaying a message regarding detection of radar waves.

In a case where radar waves are detected, (i) the display control section 40 commands the display-end connection processing section 52 to escape to W52 and (ii) the operation proceeds to a step S161 in which a message illustrated in the step S161 of FIG. 29 is displayed. The display control section 40 also commands the display-end connection processing section 52 to carry out re-connection with the tuner section 1 via another connection channel.

A given length of time after the message is displayed, the display control section 40 examines whether or not the connection is restored (S162). In a case where the connection is not restored, the operation proceeds to a step S164 in which a message illustrated in the step S164 of FIG. 29 is displayed.

On the other hand, in a case where the connection is restored, the operation proceeds to a step S163 in which a message illustrated in the step S163 of FIG. 29 is displayed. Then, it is examined whether "Confirm" item is selected on the message or 10 seconds elapsed without "Confirm" item being selected (S165). In a case where it is confirmed that "Confirm" item selected on the message or that 10 seconds elapsed without "Confirm" item being selected (YES in S165), the message of the step S163 is removed, and thus the operation ends.

[Condition of Displaying Caution]

Display of such cautions (alert messages etc.) is based on a setting that determines whether or not to display the cautions. However, there are cases where a message is preferably not displayed, depending on a connection type being employed, although the message is set to be displayed and conditions for displaying the message are met.

Therefore, the display control section 40 examines, in accordance with a table illustrated in FIG. 30, whether or not the message is to be displayed. FIG. 30 is a view illustrating a table that determines whether or not a message is to be displayed.

The table illustrated in FIG. 30 shows whether or not the aforementioned messages according to the respective connection types are to be displayed. By determining whether or not to display a message in accordance with the table, it is possible to display only a proper message according to a connection type being employed.

[Other Messages]

The display control section 40 displays various messages in addition to the aforementioned messages. For example, the display control section 40 displays messages illustrated in FIG. 31. FIG. 31 is a view illustrating a message to be displayed on the display section 2.

The message illustrated in (a) of FIG. 31 is to be displayed in a case where (i) a wireless access point connection is employed as a connection type, (ii) a connection is to be established with an unsecured wireless access point, and (iii) digital terrestrial broadcast (which can be BS/CS broadcast) is selected on "Watch Television" item or "Watch Recorded Program" item is selected. (b) of FIG. 31 illustrates the message to be displayed in a case where a recording error occurs due to execution of switching between connection types.

[Example of How Present Invention is Applicable to Other Systems]

Although the above examples illustrated how to apply the present invention to the image display system 100 in which the tuner section 1 and the display section 2 are included, the present invention is not limited to the examples, but is applicable to any systems, provided that the systems each include devices that communicate with each other via a plurality of communication paths.

Examples, in each of which the present invention is applied to another system, will be described below with reference to FIG. 32. FIG. 32 is a view schematically illustrating a monitoring system 200 and an image display system 300 to each of which the present invention is applied.

The monitoring system 200 includes a PC 201 and a monitoring camera 202. The PC 201 and the monitoring camera 202 are configured to be connectable to each other via a wired LAN so that an image being captured by the monitoring camera 202 is supplied to the PC 201 while they are connected to each other via the wired LAN. Alternatively, the PC 201 and the monitoring camera 202 can also carry out wireless communication. Such wireless communication can be, for example, Wi-Fi or the like.

Note that although the following description will discuss an example in which an image captured by the monitoring camera 202 is to be supplied to the PC 201 (personal computer), a destination to which to supply the image is not limited to a personal computer. For example, the destination can be (i) a device, such as a television or a smartphone, which has a function to display an image or (ii) a device, such as an HDD recorder, which records an image. Note also that although the monitoring camera 202 is employed as an example of a camera, a camera is not limited to such an example.

On the other hand, the image display system 300 includes a NAS 301 and a tablet device 302. The NAS 301 and the tablet device 302 are configured to be connectable to each other via PLC (Power Line Communications) so that content such as an image stored in the tablet device 302 is supplied to the tablet device 302 while they are connected to each other via the PLC. Alternatively, the NAS 301 and the tablet device 302 can also carry out wireless communication. Such wireless communication can be, for example, Wi-Fi or the like.

Note that although the following description will discuss an example in which the NAS 201 (Network Attached Storage) is the device from which an image to be displayed by the tablet device 302 is supplied, the device can be anything, provided that the device can supply an image that can be displayed by the tablet device 302. For example, the device can be a PC or the like. In addition, data supplied from the NAS 301 is not limited to an image, but can be a sound or the like. Note also that although the tablet device 302 is employed as an example of a device from which an image is supplied, the device is not limited to such an example, provided that the device has a function to supply an image.

According to each of the systems illustrated in FIG. 32, devices included in the system are paired with each other (see FIG. 32). This allows for exchange of MAC addresses of each other, exchange of addresses (IP addresses obtained during the establishment of connection to a network) of each other for use in establishment of wireless communication, and the like.

Therefore, as in the image display system 100, it is easy to find a partner device connected to a wired LAN network or a PLC network, and connect to the partner device.

Specifically, according to the example of FIG. 32, (i) the monitoring camera 202 is located outside a building, and is connected to a wired LAN connector located outside the building and (ii) the PC 201 is located on the first floor of the building, and is connected to a wired LAN connector located inside the building. Note that these devices could exchange an image via wireless communication. However, since these devices are located as far away from each as inside and outside the building, the wireless communication is difficult, and therefore the wired LAN connection is employed. Needless to say, a wired connection to be employed is not limited to the wired LAN connection, but a PLC or the like can be employed.

In such conditions, either the PC 201 or the monitoring camera 202 transmits (broadcasts), to the devices connected to the wired LAN network, a device search packet containing a MAC address or a pairing ID of a partner device which was obtained upon the pairing with the partner device.

Therefore, a response is to be transmitted from, of all the devices which received the device search packet, the PC 201 or the monitoring camera 202 that recognizes the MAC address or the pairing ID contained in the device search packet. A wired LAN connection is thus established between the PC 201 and the monitoring camera 202.

In addition, according to the example of FIG. 32, (i) the NAS 301 is located on the first floor of a building, and is connected to the PLC via an outlet and (ii) the tablet device 302 is located on the second floor of the building, and is connected to the PLC via an outlet. Note that these devices could exchange an image via wireless communication. However, since these devices are located on different floors of a building reinforced with steel, the wireless communication is difficult, and therefore the PLC is employed. Needless to say, a wired connection to be employed is not limited to the PLC, but a wired LAN connection or the like can be employed.

An operation to be executed after both the devices of the image display system 300 are connected via the PLC is similar to that executed in the case of the monitoring system 200. Specifically, MAC addresses or the like of each other (partner devices) are recognized so that communication via the PLC is established.

According to the monitoring system 200 and the image display system 300, a partner device in a wired network is thus detected by use of a MAC address or the like which is obtained upon pairing with the partner device. This makes it extremely easy to establish a wired connection.

Alternatively, it is also possible to use AOSS (AirStation One-Touch Secure System; registered trademark) for the pairing in the examples. In such a case, devices are to be detected with the use of information obtained upon pairing which is carried out by employing the AOSS.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

Lastly, blocks of the tuner section 1 and the display section 2, particularly the tuner control section 10 and the display control section 40 can each be (i) realized by means of hardware by use of logic circuits provided on an integrated circuit (IC chip) or (ii) realized by means of software by use of a CPU (Central Processing Unit).

In the latter case, the tuner section 1 and the display section 2 each include storage devices (storage media) such as (i) a CPU for executing a command of a program for achieving a function, (ii) a ROM (Read Only Memory) for storing the program, (iii) a RAM (Random Access Memory) for extracting the program, (iv) a memory for storing the program and various data, and the like. The object of the present invention can also be attained by (i) providing a storage medium in each of the tuner section 1 and the display section 2, the storage medium having stored (in a computer-readable manner) program codes (executable program, intermediate code program, and source program) of a control program for each of the tuner section 1 and the display section 2, which control program is a piece of software for achieving the function and (ii) causing a computer (or CPU or MPU) to read out and then execute the program codes thus stored in the storage medium.

Examples of the storage medium encompass (i) tapes such as a magnetic tape and a cassette tape, (ii) disks including magnetic disks such as a floppy disk (Registered Trademark) and a hard disk and optical disks such as a CD-ROM, an MO, an MD, a DVD, and a CD-R, (iii) cards such as an IC card (including a memory card) and an optical card, (iv) semiconductor memories such as a mask ROM, an EPROM, an EEPROM, and a flash ROM, and (v) logic circuits such as a PLD (Programmable logic device) and an FPGA (Field Programmable Gate Array).

Furthermore, the tuner section 1 and the display section 2 can each be configured to be connectable to a communications network so as to be provided with the program code via the communications network. The communications network is not limited to any particular one, provided that the program code can be transmitted via the communications network. Examples of the communications network encompass the Internet, an intranet, an extranet, a LAN, an ISDN, a VAN, a CATV communications network, a virtual dedicated network (virtual private network), a telephone line network, a mobile communications network, and a satellite communications network. A transfer medium for configuring the communications network need only be a medium via which the program code can be transmitted, and is not limited to any particular configuration or any type. Examples of the transfer medium encompass (i) wired lines such as IEEE 1394, a USB, an electric power line, a cable TV line, a telephone line, and an ADSL (Asymmetric Digital Subscriber Line) and (ii) wireless communications such as an infrared radiation (e.g. IrDA and remote control), Bluetooth (Registered Trademark), IEEE 802.11 wireless, HDR (High Data Rate), NFC (Near Field Communication), DLNA (Digital Living Network Alliance), a mobile telephone network, a satellite line, and a terrestrial digital network. Note that the present invention encompasses transmission of a computer data signal which is (i) embodied by electronic transmission of the program code and (ii) incorporated in a carrier wave.

[Summary of Invention]

As has been described, a communication device of the present invention includes: device detecting means for detecting, in a case where a switch to communication via a second communication path is to be made, a partner device with use of partner device specifying information for specifying the partner device, which partner device specifying information is obtained for establishing communication via a first communication path; and communication establishing means for establishing the communication, via the second communication path, with the partner device which has been detected by the device detecting means.

Hence, the detection of the partner device, which is capable of communication via the first communication path, and the establishment of the communication with the partner device via the second communication path are automated. This allows a user to, without manually executing any operation, extremely easily set a function of switching between communication paths.

The communication device is preferably configured such that: the first communication path is a wireless communication path; and the partner device specifying information is information which is obtained when the communication device is paired with the partner device for wireless communication.

Note that when pairing, which is necessary for wireless communication, is executed, information for specifying a partner device with which to wirelessly communicate is obtained. The information can be used as the partner device specifying information. That is, with the configuration, it is possible to automate establishment of communication via the second communication path with the use of information which is due to be obtained as a result of the pairing.

The communication device is preferably configured such that the communication establishing means establishes communication with the partner device via the second communication path in a case where it is confirmed that first information, which the partner device obtains when paired with the communication device, or second information generated based on the first information is received from the partner device which has been detected by the device detecting means.

According to the configuration, communication with the partner device detected by the device detecting means is not unconditionally established, but is established in a case where it is confirmed that the first information, which the partner device obtains when paired with the communication device, or the second information, which is generated based on the first information, is received. The first and second information each validate the partner device. In other words, with the configuration, it is possible to avoid connecting to other devices which pretend to be the partner device.

The communication device is preferably configured such that: the second communication path is a communication path running through a communication network; and the device detecting means detects the partner device by carrying out broadcast transmission, to a device within the communication network, of a response request containing (i) the partner device specifying information or (ii) information generated based on the partner device specifying information.

According to the configuration, the response request is transmitted (broadcast) to a device(s) within the communication network. This means that the partner device, which is located within the communication network, receives the response request as well. In addition, the response request contains the partner device specifying information or the information generated based on the partner device specifying information. This causes the partner device to (i) determine, by referring to such information, that the response request is directed to the partner device and then (ii) respond in response to the response request. That is, the device detecting means can detect the partner device by receiving the response from the partner device.

The communication device can also specify, by confirming where the response was transmitted from, an address which is necessary for communicating with the partner device via the second communication path. In addition, the partner device can specify, by confirming where the response request was transmitted from, an address which is necessary for communicating with the communication device via the second communication path. That is, with the configuration, it is possible to even set the establishment of the communication via the second communication path.

The communication device is preferably configured such that the first communication path is a communication path via which the communication device directly communicates with the partner device, the communication device further including: path switching means for switching to the communication via the second communication path in a case where the path switching means receives, while the communication device has the communication with the partner device via the first communication path, heavy-workload information which has been transmitted from the partner device and which indicates that a workload of the partner device is heavy.

According to the configuration, switching to the communication via the second communication path is carried out when the heavy-workload information is received from the partner device while the communication device has the communication with the partner device via the first communication path which is a communication path via which the communication device directly communicates with the partner device. This allows the partner device to be no longer in conditions in which to directly communicate with the communication device. That is, with the configuration, it is possible to reduce the workload of the partner device when the workload of the device is heavy.

In addition, advantageous effects, which are similar to those brought about by the communication device, can be brought about by a communication system including: the communication device; and the partner device with which the communication device communicates via a first or second communication path.

The communication system is preferably configured such that: the communication device further includes partner device controlling means for causing a communication path on a partner-device end to be switched from the first communication path to the second communication path; and the partner device further includes (i) communication availability determining means for determining whether or not communication with the communication device via the second communication path is available, when the communication availability determining means receives, from the partner device controlling means, a command to switch to the communication via the second communication path and (ii) partner device-end path switching means for switching to the communication via the second communication path in a case where the communication availability determining means determines that the communication via the second communication path is available.

According to the configuration, the communication device transmits a command to switch a communication path on a partner-device end from the first communication path to the second communication path. Then, the partner device, which has received the command, (i) determines whether or not the communication via the second communication path is available and then (ii), if it is determined that such communication is available, switches to the communication via the second communication path. This makes it possible to avoid undesirably switching to the communication via the second communication path while the communication via the second communication path is unavailable.

Note that the communication device and the partner device can each be realized by a computer. In such a case, the following are also encompassed in the scope of the present invention: (i) a program for controlling the communication device to operate, the program causing a computer to serve as each means included in the communication device, (ii) a program for controlling the partner device to operate, the program causing a computer to serve as communication availability determining means and as partner device-end path switching means, and (iii) a computer-readable storage medium in which each of the programs is stored.

INDUSTRIAL APPLICABILITY

The present invention can be used for a device that carries out communication via a plurality of communication paths.

REFERENCE SIGNS LIST

1 Tuner section (partner device)

2 Display section (communication device)

20 Tuner-end path switching section (communication availability determining means, partner device-end path switching means)

50 Display-end path switching section (path switching means)

51 Tuner commanding section (partner device controlling means)

52 Display-end connection processing section (device detecting means, communication establishing means)
100 Image display system (communication system)
(a) Communication path (first communication path)
(c) Communication path (second communication path)

The invention claimed is:

1. A communication device for communicating with a partner device via a first communication path or a second communication path, comprising:
   device detecting means for detecting, in a case where a switch to communication via the second communication path is to be made, the partner device with use of partner device specifying information for specifying the partner device, which partner device specifying information is obtained for establishing communication via the first communication path; and
   communication establishing means for establishing the communication, via the second communication path, with the partner device which has been detected by the device detecting means,
   the first communication path being a wireless communication path, and
   the partner device specifying information being information which is obtained when the communication device is paired with the partner device for wireless communication.

2. The communication device as set forth in claim 1, wherein:
   the communication establishing means establishes communication with the partner device via the second communication path in a case where it is confirmed that first information, which the partner device obtains when paired with the communication device, or second information generated based on the first information is received from the partner device which has been detected by the device detecting means.

3. A communication system comprising:
   a communication device as set forth in claim 1; and
   a partner device with which the communication device communicates via a first or second communication path.

4. The communication system as set forth in claim 3, wherein:
   the communication device further comprises
   partner device controlling means for causing a communication path on a partner-device end to be switched from the first communication path to the second communication path; and
   the partner device further comprises
   (i) communication availability determining means for determining whether or not communication with the communication device via the second communication path is available, when the communication availability determining means receives, from the partner device controlling means, a command to switch to the communication via the second communication path and
   (ii) partner device-end path switching means for switching to the communication via the second communication path in a case where the communication availability determining means determines that the communication via the second communication path is available.

5. A non-transitory computer-readable storage medium in which a program for controlling a communication device as set forth in claim 1 to operate, the program causing a computer to serve as each means included in the communication device is stored.

6. A non-transitory computer-readable storage medium in which a program for controlling a partner device as set forth in claim 4 to operate, the program causing a computer to serve as communication availability determining means and as partner device-end path switching means is stored.

7. A communication device for communicating with a partner device via a first communication path or a second communication path, comprising:
   device detecting means for detecting, in a case where a switch to communication via the second communication path is to be made, the partner device with use of partner device specifying information for specifying the partner device, which partner device specifying information is obtained for establishing communication via the first communication path; and
   communication establishing means for establishing the communication, via the second communication path, with the partner device which has been detected by the device detecting means,
   the second communication path being a communication path running through a communication network, and
   the device detecting means being configured to detect the partner device by carrying out broadcast transmission, to a device within the communication network, of a response request containing (i) the partner device specifying information or (ii) information generated based on the partner device specifying information.

8. A communication device for communicating with a partner device via a first communication path or a second communication path, comprising:
   device detecting means for detecting, in a case where a switch to communication via the second communication path is to be made, the partner device with use of partner device specifying information for specifying the partner device, which partner device specifying information is obtained for establishing communication via the first communication path;
   communication establishing means for establishing the communication, via the second communication path, with the partner device which has been detected by the device detecting means; and
   path switching means for switching to the communication via the second communication path in a case where the path switching means receives, while the communication device has the communication with the partner device via the first communication path, information which has been transmitted from the partner device and which indicates that a workload of the partner device is heavy,
   the first communication path being a communication path via which the communication device directly communicates with the partner device.

9. A method in which a communication device communicates with a partner device via a first communication path or a second communication path, the method comprising the steps of:
   (i) detecting, in a case where a switch to communication via the second communication path is to be made, the partner device with use of partner device specifying information for specifying the partner device, which partner device specifying information is obtained for establishing communication via the first communication path; and
   (ii) establishing the communication, via the second communication path, with the partner device which has been detected in the step (i),
   the first communication path being a wireless communication path; and the partner device specifying information being information which is obtained when the communication device is paired with the partner device for wireless communication.

10. A television receiving system comprising:
a tuner section for converting a broadcast wave into an image signal; and
a display section for communicating with the tuner section via a first communication path or a second communication path so as to display an image in accordance with the image signal,
the display section including
(i) device detecting means for detecting, in a case where a switch to communication via the second communication path is to be made, the tuner section with use of partner device specifying information for specifying the tuner section, which partner device specifying information is obtained for establishing communication via the first communication path and
(ii) communication establishing means for establishing the communication, via the second communication path, with the tuner section which has been detected by the device detecting means,
the first communication path being a wireless communication path, and
the partner device specifying information being information which is obtained when the display section is paired with the tuner section for wireless communication.

11. A method in which a communication device communicates with a partner device via a first communication path or a second communication path, the method comprising the steps of:
(i) detecting, in a case where a switch to communication via the second communication path is to be made, the partner device with use of partner device specifying information for specifying the partner device, which partner device specifying information is obtained for establishing communication via the first communication path; and
(ii) establishing the communication, via the second communication path, with the partner device which has been detected in the step (i),
the second communication path being a communication path running through a communication network, and
in the step (i), the partner device being detected by carrying out broadcast transmission, to a device within the communication network, of a response request containing (i) the partner device specifying information or (ii) information generated based on the partner device specifying information.

12. A method in which a communication device communicates with a partner device via a first communication path or a second communication path, the method comprising the steps of:
(i) detecting, in a case where a switch to communication via the second communication path is to be made, the partner device with use of partner device specifying information for specifying the partner device, which partner device specifying information is obtained for establishing communication via the first communication path;
(ii) establishing the communication, via the second communication path, with the partner device which has been detected in the step (i); and
(iii) switching to the communication via the second communication path in a case where information, which has been transmitted from the partner device and which indicates that a workload of the partner device is heavy, is received while the communication device has the communication with the partner device via the first communication path,
the first communication path being a communication path via which the communication device directly communicates with the partner device.

13. A television receiving system comprising:
a tuner section for converting a broadcast wave into an image signal; and
a display section for communicating with the tuner section via a first communication path or a second communication path so as to display an image in accordance with the image signal,
the display section including
(i) device detecting means for detecting, in a case where a switch to communication via the second communication path is to be made, the tuner section with use of partner device specifying information for specifying the tuner section, which partner device specifying information is obtained for establishing communication via the first communication path and
(ii) communication establishing means for establishing the communication, via the second communication path, with the tuner section which has been detected by the device detecting means,
the second communication path being a communication path running through a communication network; and
the device detecting means being configured to detect the tuner section by carrying out broadcast transmission, to a device within the communication network, of a response request containing (i) the partner device specifying information or (ii) information generated based on the partner device specifying information.

14. A television receiving system comprising:
a tuner section for converting a broadcast wave into an image signal; and
a display section for communicating with the tuner section via a first communication path or a second communication path so as to display an image in accordance with the image signal,
the display section including
(i) device detecting means for detecting, in a case where a switch to communication via the second communication path is to be made, the tuner section with use of partner device specifying information for specifying the tuner section, which partner device specifying information is obtained for establishing communication via the first communication path,
(ii) communication establishing means for establishing the communication, via the second communication path, with the tuner section which has been detected by the device detecting means, and
(iii) path switching means for switching to the communication via the second communication path in a case where the path switching means receives, while the display section has the communication with the tuner section via the first communication path, information which has been transmitted from the tuner section and which indicates that a workload of the tuner section is heavy,
the first communication path being a communication path via which the display section directly communicates with the tuner section.

* * * * *